US009008281B2

(12) United States Patent
Ashizuka

(10) Patent No.: US 9,008,281 B2
(45) **Date of Patent: *Apr. 14, 2015**

(54) CORDLESS TELEPHONE SYSTEM AND SAFETY MANAGEMENT SYSTEM

(71) Applicant: Panasonic Corporation, Osaka (JP)

(72) Inventor: Tetsuya Ashizuka, Fukuoka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 0 days.

This patent is subject to a terminal disclaimer.

(21) Appl. No.: 14/204,097

(22) Filed: Mar. 11, 2014

(65) Prior Publication Data

US 2014/0270096 A1 Sep. 18, 2014

(30) Foreign Application Priority Data

Mar. 13, 2013 (JP) ................................ 2013-050354

(51) Int. Cl.
*H04M 11/00* (2006.01)
*G08B 21/02* (2006.01)

(52) U.S. Cl.
CPC .......... *G08B 21/0222* (2013.01); *G08B 21/023* (2013.01); *G08B 21/0247* (2013.01); *G08B 21/0283* (2013.01)

(58) Field of Classification Search
CPC ........... G08B 13/2491; H04M 1/0202; H04M 1/72502; H04M 1/72516
USPC .......................................... 379/38; 340/573.4
See application file for complete search history.

(56) References Cited

U.S. PATENT DOCUMENTS

| | | | | | |
|---|---|---|---|---|---|
| 4,598,272 | A | * | 7/1986 | Cox | 340/539.21 |
| 5,564,429 | A | * | 10/1996 | Bornn et al. | 600/508 |
| 5,652,570 | A | * | 7/1997 | Lepkofker | 340/573.4 |
| 5,812,056 | A | * | 9/1998 | Law | 340/539.15 |
| 5,841,352 | A | * | 11/1998 | Prakash | 340/573.4 |
| 5,870,029 | A | * | 2/1999 | Otto et al. | 340/8.1 |

(Continued)

FOREIGN PATENT DOCUMENTS

| | | |
|---|---|---|
| JP | 63-037278 | 2/1988 |
| JP | H04-314242 A | 11/1992 |

(Continued)

OTHER PUBLICATIONS

Ashizuka, T., "Cordless Telephone System and Safety Management System," Office Action mailed May 21, 2013, for JP2013-050354, 4 pages.

(Continued)

*Primary Examiner* — Stella Woo
(74) *Attorney, Agent, or Firm* — Seed IP Law Group PLLC

(57) ABSTRACT

Provided is a cordless telephone system including a base unit (100) connected to a telephone line and a handset (200) configured to transmit and receive radio waves to and from the base unit via wireless channel, wherein the handset includes a strength measurement unit (20) configured to measure a radio wave strength when the radio waves transmitted by the base unit are received by the handset, and a control unit (10) configured to measure a distance between the base unit and the handset based on a result of measurement performed by the strength measurement unit and to perform a prescribed safety management action when the distance becomes larger than a predetermined value.

22 Claims, 13 Drawing Sheets

(56) References Cited

U.S. PATENT DOCUMENTS

| | | | | |
|---|---|---|---|---|
| 6,078,260 A * | 6/2000 | Desch | 340/573.1 |
| 2005/0070272 A1* | 3/2005 | Marangos | 455/426.2 |
| 2006/0176178 A1* | 8/2006 | Everest et al. | 340/572.1 |
| 2010/0210289 A1* | 8/2010 | Rooks et al. | 455/463 |

FOREIGN PATENT DOCUMENTS

| | | | |
|---|---|---|---|
| JP | 05-068151 | U | 9/1993 |
| JP | H08-154243 | A | 6/1996 |
| JP | 09-009327 | A | 1/1997 |
| JP | H10-336104 | A | 12/1998 |
| JP | 2001-052288 | A | 2/2001 |
| JP | 2002-064857 | A | 2/2002 |
| JP | 2002-209261 | A | 7/2002 |
| JP | 2004-118362 | A | 4/2004 |
| JP | 2007-102441 | A | 4/2007 |
| JP | 2007-122123 | A | 5/2007 |
| JP | 2012-202879 | A | 10/2012 |

OTHER PUBLICATIONS

Ashizuka, T., "Cordless Telephone System and Safety Management System," Office Action mailed Jul. 30, 2013, for JP2013-050354, 3 pages.

Ashizuka, T., "Cordless Telephone System and Safety Management System," Final Office Action mailed Nov. 26, 2013, for JP2013-050354, 3 pages.

* cited by examiner

CORDLESS TELEPHONE SYSTEM AND SAFETY MANAGEMENT SYSTEM

TECHNICAL FIELD

The present invention relates to a cordless telephone system having a safety management function of detecting and notifying that a person who needs supervision, such as an infant or an elderly person, has moved away from around a supervisor who supervises the person who needs supervision by a predetermined distance, and to a safety management system.

BACKGROUND OF THE INVENTION

People's interest in security is increasing every year. For example, attracting high attention is detection of wandering of patients with dementia, prevention of infant abduction, etc. (hereinafter, summarily referred to as "safety management." Further, a safety management action refers to an action taken in relation to the safety management). As a system for performing such a safety management action, there is known a safety management system that includes a wandering sensor(s) as a main component thereof. In this safety management system, entering of a person carrying a transmitter tag into a predetermined zone in a hospital, for example, is detected by a receiver, which transmits the ID information and the like stored in the transmitter tag to a management device, thereby notifying wandering behaviors in real-time.

As another example of such a system, disclosed is a safety management system in which transmitters are fitted on children (namely, those who need supervision), and presence of a child or children in predetermined areas of a facility is detected by multiple antennas, such that the locations of the children can be recognized based on the detection information from the antennas, and the number of the detected children and their degree of risk are assessed by a wireless communication server (see JP2004-118362A).

Further, as technology relating to the aforementioned safety management, disclosed is a security monitoring system in which, to detect theft of a terminal device such as a notebook PC (namely, absence of the terminal device where it should be), the terminal device is configured to, upon activation, obtain longitude and latitude from the GPS (Global Positioning System), and when the location indicated by the obtained longitude and latitude is outside an area in which the use of the terminal device is permitted, perform notification to the security monitoring center (see JP2007-102441A).

However, in the safety management system using wandering sensors, it is necessary to mount a number of sensors (receivers) at various locations in the hospital such as corridors and patient rooms, for example, in addition to installing a management device for collecting the outputs from the sensors and, in some cases, laying the lines to connect the management device to a central device operated by a company. Thus, the cost of laying the lines and installing the management device tends to increase the total cost of the system.

The technology disclosed in JP2004-118362A also requires a large-scale configuration including the multiple antennas and wireless communication server, and thus, tends to be so expensive that cannot be purchased easily by personal users.

The technology disclosed in JP2007-102441A uses the data communicated between the terminal device and the management device when the terminal device is connected to the network and the position information from the GPS or the like, and thus, the system also cannot be purchased easily by personal users.

SUMMARY OF THE INVENTION

The present invention is made to solve the foregoing problems in the prior art, and a primary object of the present invention is to provide a cordless telephone system capable of detecting wandering behavior or the like reliably and with a simple structure, without need for a special sensor for detecting wandering behavior or the like provided to a handset constituting the cordless telephone system.

To achieve the foregoing object, in one aspect of the present invention, there is provided a cordless telephone system, including: a base unit connected to a telephone line; and a handset configured to transmit and receive radio waves to and from the base unit via wireless channel, wherein the handset includes: a strength measurement unit configured to measure a radio wave strength when the radio waves transmitted from the base unit are received by the handset; and a control unit configured to measure a distance between the base unit and the handset based on a result of measurement performed by the strength measurement unit and to perform a prescribed safety management action when the distance becomes larger than a predetermined value.

According to this structure, it is possible to measure the distance between the base unit and the handset and detect wandering behavior or the like reliably and with a simple structure, without need for a special sensor for detecting wandering behavior or the like provided to the handset constituting the cordless telephone system.

Preferably, the base unit and the handset perform transmission and reception based on time division multiple access, and the control unit is configured to measure the distance based on a result of measurement performed by the strength measurement unit when control data transmitted from the base unit is received by the handset.

According to this structure, the handset receives the control data transmitted by the base unit in the control slot of each frame in the time division multiple access, and measures the signal strength at this time to perform the monitoring. Therefore, it is unnecessary to allocate a special slot for the purpose of monitoring, and this enables efficient use of the radio waves.

In another aspect of the present invention, there is provided a cordless telephone system including a base unit, a first handset and a second handset, the base unit and the first handset being configured to transmit and receive radio waves to and from each other via wireless channel, and the base unit and the second handset being configured to transmit and receive radio waves to and from each other via wireless channel, wherein the second handset includes: a strength measurement unit configured to measure a radio wave strength when the radio waves transmitted from the base unit are received by the second handset; and a control unit configured to measure a distance between the base unit and the handset based on a result of measurement performed by the strength measurement unit and to perform a prescribed safety management action when the distance becomes larger than a predetermined value, and wherein the prescribed safety management action includes transmission of a first notification to the base unit, and the base unit is configured, upon receipt of the first notification, to transmit a second notification to the first handset.

According to this structure, it is possible to measure the distance between the base unit and the second handset and detect wandering behavior or the like reliably and with a simple structure, without need for a special sensor for detecting wandering behavior or the like provided to the handset constituting the cordless telephone system. Further, when an abnormality is detected by the second handset, notification can be made to the first handset via the base unit.

Preferably, the base unit and the second handset perform transmission and reception based on time division multiple access, and the control unit is configured to measure the distance based on a result of measurement performed by the strength measurement unit when control data transmitted from the base unit is received by the second handset.

According to this structure, the second handset receives the control data transmitted by the base unit in the control slot of each frame in the time division multiple access, and measures the signal strength at this time to perform the monitoring. Therefore, it is unnecessary to allocate a special slot for the purpose of monitoring, and this enables efficient use of the radio waves.

In another aspect of the present invention, there is provided a cordless telephone system including a base unit, a first handset and a second handset, the first handset and the second handset being configured to transmit and receive radio waves to and from each other via wireless channel, wherein the second handset includes: a strength measurement unit configured to measure a radio wave strength when the radio waves transmitted from the first handset is received by the second handset; and a control unit configured to measure a distance between the first handset and the second handset based on a result of measurement performed by the strength measurement unit and to perform a prescribed safety management action when the distance becomes larger than a predetermined value, and wherein the prescribed safety management action includes transmission of a first notification to the first handset.

According to this structure, since the handsets are portable, by having a person to be monitored (a person who needs supervision) carry the second handset and having a supervisor, who is normally within a predetermined distance from the person to be monitored, carry the first handset, it is possible to perform the monitoring (supervision) easily and reliably by use of the first handset and the second handset even when they are outside the communication range of the base unit.

Preferably, the base unit and the first handset are configured to transmit and receive radio waves to and from each other, and the first handset transmits a second notification to the base unit upon receipt of the first notification from the control unit of the second handset.

According to this structure, the detection of an abnormality is transmitted from the second handset to the first handset, and then, from the first handset to the base unit in a bucket brigade manner. Namely, by using the first handset as a relay connecting the base unit and the second handset, it is possible to expand the range in which the monitoring is performed.

Preferably, the first handset and the second handset perform transmission and reception based on time division multiple access, and the control unit is configured to measure the distance based on a result of measurement performed by the strength measurement unit when control data transmitted from the first handset is received by the second handset.

According to this structure, the second handset receives the control data transmitted by the first handset in the control slot of each frame in the time division multiple access, and measures the signal strength at this time to perform the monitoring. Therefore, it is unnecessary to allocate a special slot for the purpose of monitoring, and this enables efficient use of the radio waves.

Preferably, the handset further includes a response button, and the control unit is configured, in response to an operation of the response button, to make a phone call to the base unit.

According to this structure, when the distance between the base unit and the handset becomes larger than a predetermined distance and it is determined by the handset that there is an abnormality, a phone call is established between base unit and the handset, which can contribute to preventing wandering behavior or the like.

Also preferably, the second handset further includes a response button; and the control unit is configured, in response to an operation of the response button, to make a phone call to at least one of the base unit and the first handset.

According to this structure, when the distance between the first handset and the second handset (or between the base unit and the second handset) becomes larger than a predetermined distance and it is determined by the second handset that there is an abnormality, a phone call is established between the first handset (or the base unit) and the second handset, which can contribute to preventing wandering behavior or the like.

Preferably, the safety management action includes at least one of setting off an alarm sound, outputting a predetermined message, making a phone call to a predetermined party, and making notification via the wireless channel.

According to this structure, it is possible, for example, to give an alert to a wandering person, to give a warning to a suspicious person or to make a notification to an appropriate party(s) such as a security company. Further, when an abnormality is detected by the handset, it is possible to allow the base unit or another handset notified of the detection via the wireless channel to emit an alarm or the like.

In another aspect of the present invention, there is provided a safety management system, including: a transmitting unit configured to emit radio waves; and a receiving unit configured to be carried by a person who needs supervision and to receive the radio waves emitted by the transmitting unit, wherein the receiving unit includes: a strength measurement unit configured to measure a strength of the received radio waves; and a control unit configured to measure a distance between the transmitting unit and the receiving unit based on a result of measurement performed by the strength measurement unit and to perform a prescribed safety management action when the distance becomes larger than a predetermined value.

According to this structure, it is possible to measure the distance between the transmitting unit and the receiving unit and thereby detect wandering behavior or the like reliably and with a simple structure, without need for a special sensor for detecting wandering behavior or the like provided to the receiving unit constituting the safety management system.

BRIEF DESCRIPTION OF THE DRAWINGS

Now the present invention is described in the following in terms of preferred embodiments thereof with reference to the appended drawings, in which.

DETAILED DESCRIPTION OF THE PREFERRED EMBODIMENTS

First Embodiment

In the following, a first embodiment of the present invention will be described with reference to the appended drawings.

Figure 1:
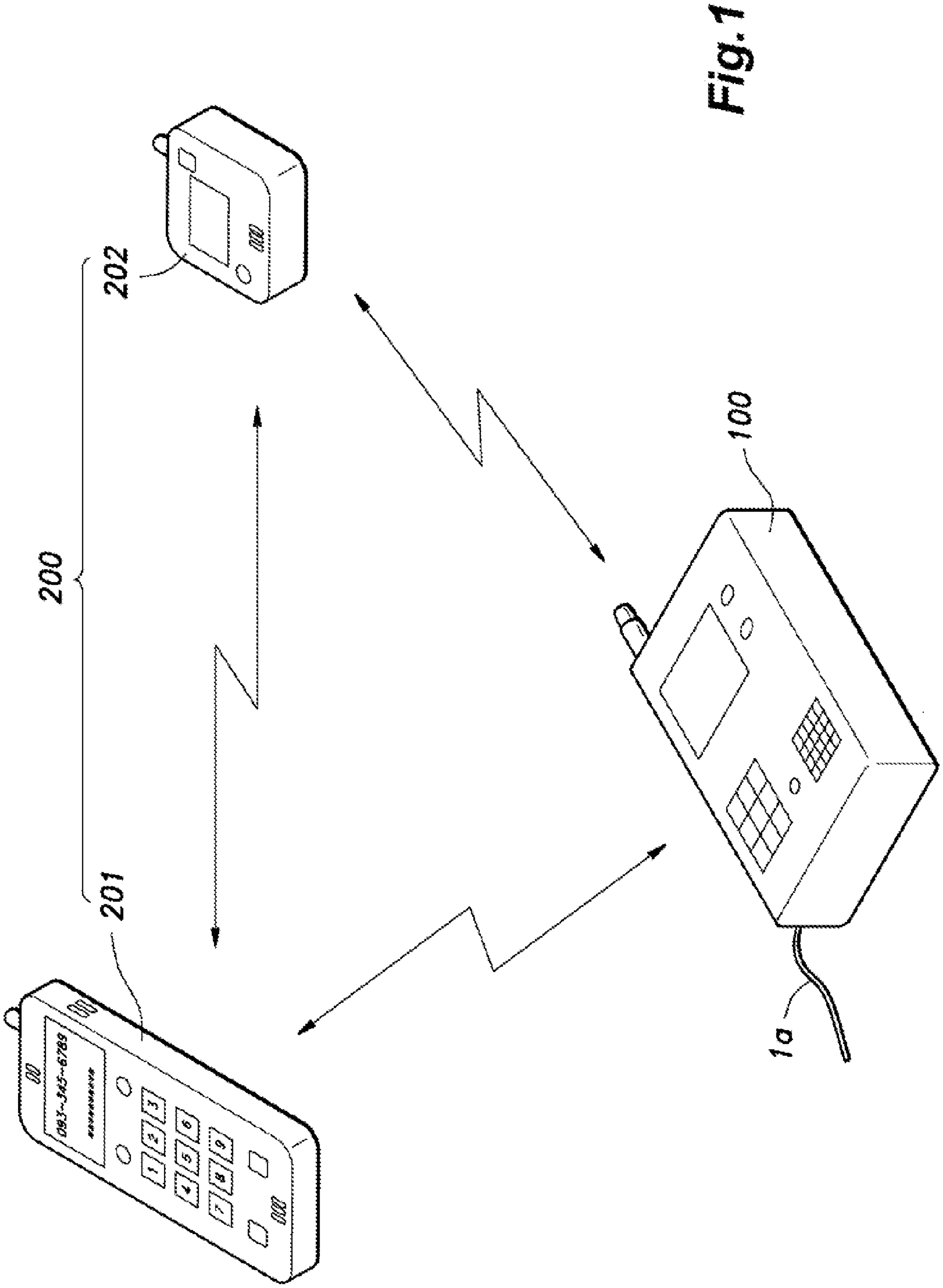
FIG. 1 is an explanatory diagram for showing a relationship between a base unit, a first handset and a second handset of a cordless telephone system according to the first embodiment of the present invention.

FIG. 1 is an explanatory diagram showing a relationship between a base unit 100, a first handset 201 and a second handset 202 of a cordless telephone system according to the first embodiment. As shown in FIG. 1, the cordless telephone system is constituted of a base unit 100 and two handsets 200 (first handset 201 and second handset 202). In the following description, when it is not necessary to distinguish between the first handset 201 and the second handset 202, they may be referred to as the handset(s) 200. It is to be noted that the number of the handsets 200 that can be included in the system is not limited to two, and the cordless telephone system may include three or more handsets 200, for example.

The base unit 100 is connected to a public telephone line not shown in the drawings via a telephone line la, and communicates audio data with another telephone via the public telephone line.

The base unit 100 communicates with the first handset 201 via wireless channel, and audio data or the like is transmitted and received between the base unit 100 and the first handset 201. Thereby, the first handset 201 can access the public telephone line via the base unit 100. On the other hand, the second handset 202 is used for safety management (this may also be referred to as "supervision") such as detection of wandering of an elderly person or detection of an infant apart from its parent or the like by a predetermined distance. Further, the first handset 201 and the second handset 202 are configured to be capable of communicating audio data with each other via the base unit 100 or directly, so that phone calls can be made between the handsets 201 and 202. Further, the base unit 100 and the second handset 202 are configured such that phone calls can be made therebetween. In the following description, an a person who conduct supervision may be referred to as a "supervisor" and a person to be supervised may be referred to as a "person who needs supervision."

Figure 2:
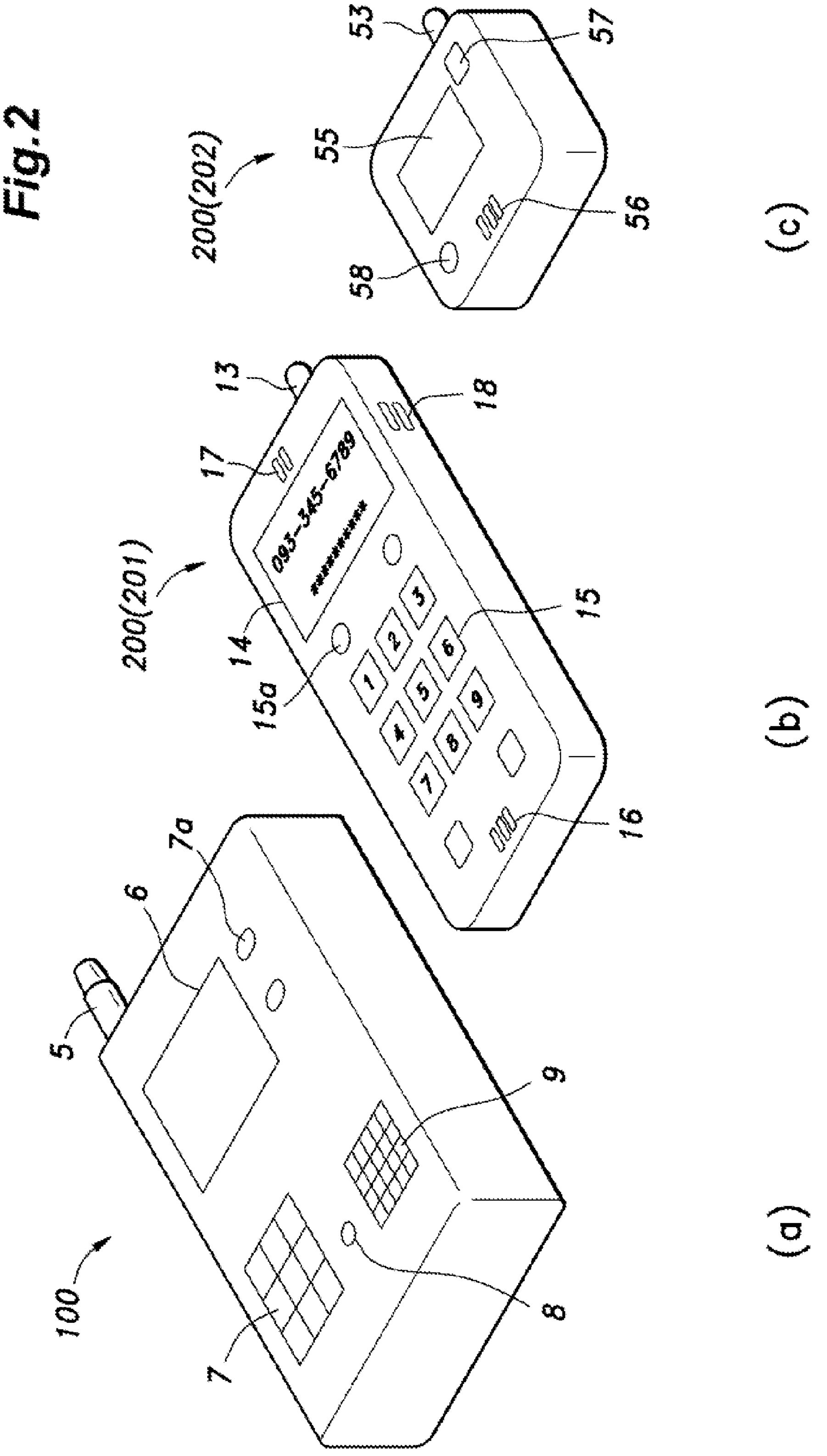
FIGS. 2A, 2B and 2C are overall perspective views of the base unit, first handset and second handset, respectively, of the cordless telephone system.

FIGS. 2A, 2B and 2C are overall perspective views of the base unit 100, first handset 201 and second handset 202 of the cordless telephone system according to the first embodiment. In the following, with reference to FIGS. 2A, 2B and 2C, explanation will be given of a general structure of the base unit 100, first handset 201 and second handset 202 of the cordless telephone system according to the first embodiment.

In the first embodiment, explanation will be made taking as an example a digital cordless telephone system basically conforming to DECT (Digital Enhanced Cordless Telecommunications). DECT is a standard of digital cordless telephone systems established in 2011, and uses a frequency range of 1.9 GHz band (1,895,616 KHz to 1,902,528 KHz) and TDMA (Time Division Multiple Access)-WB as a communication method. It is said that DECT can reduce communication failure caused by radio wave interference with other devices and the 1.9 GHz frequency used in DECT does not interfere with a wireless LAN or a microwave oven, and therefore, DECT can maintain the quality of communication of a facsimile, telephone or the like. Further, DECT is known as a communication method that enables a wideband communication of audio data or the like, in which the state of use of frequency channels is monitored at all times, so that the device itself can select an optimum channel, whereby frequencies can be used efficiently.

It is to be noted that the later-described detection of a distance between a supervisor and a person who needs supervision larger than a predetermined distance based on measurement of radio wave strength (hereinafter, simply referred to as "monitoring") may be implemented not only by cordless telephone systems of the DECT type, but also by cordless telephone systems of another type, such as PHS (Personal Handy-phone System) or sPHS (Super PHS), which may include a combination of the base unit 100 and the handset 200 or a combination of the first handset 201 and the second handset 202.

With reference to FIG. 2A, when a user places a phone call using the base unit 100, the user searches for or input the telephone number of a party to be called by use of a display unit 6 and/or an operation unit 7 of the base unit 100 in a manner similar to when using an ordinary fixed-line phone. Once the connection is established, audio data can be communicated between the base unit 100 and another telephone connected thereto via a public telephone line. The base unit 100 is equipped with a microphone 8 through which the user's voice is input and a speaker 9 for outputting the voice of the person on the other end of the line, so that the user can talk with the person on the other end of the line in the so-called hands-free condition. It is to be noted that the illustrated base unit 100 is not equipped with a dedicated handset for use in the vicinity thereof, but the base unit 100 may have a dedicated handset which may be wired or wireless. Further, the base unit 100 is provided with a monitoring instruction button 7*a*, such that when the user presses the monitoring instruction button 7*a*, monitoring is started. After the instruction of start of monitoring, when the monitoring instruction button 7*a* is pressed again, the monitoring is terminated. It is to be noted that the monitoring instruction button 7*a* of the base unit 100 is operated when the monitoring is to be performed by use of the base unit 100 and the second handset 202.

With reference to FIG. 2B, when using the first handset 201 also, the user inputs or otherwise specifies the telephone number of the party to be called by use of a display unit 14 and/or an operation unit 15 of the first handset 201. The first handset 201 is equipped with a microphone 16 for capturing the voice to be transmitted, an audio-output speaker 17 for outputting the voice regenerated from the received signal, and a ringer speaker 18. The first handset 201 transmits and receives audio data to and from another telephone via the base unit 100. Further, similarly to the base unit 100, the first handset 201 also is provided with a monitoring instruction button 15*a*, such that when the user presses the monitoring instruction button 15*a*, monitoring is started, and thereafter, upon pressing of the button 15*a* again, the monitoring is terminated. The monitoring instruction button 15*a* of the first handset 201 is operated when the monitoring is to be performed by use of the first handset 201 and the second handset 202.

As shown in FIG. 2C, the second handset 202 includes an antenna (second handset antenna) 53, a response button 55, a microphone 56, an audio-output speaker 57 and a switch 58. The second handset 202 is configured to be carried by a person who needs supervision when supervision is to be performed. Specifically, unlike the first handset 201, the second handset 202 does not include a display unit and an operation unit so as to be compact in size and able to be readily carried by a person who needs supervision. Upon pressing of the switch 58, the second handset 202 is activated and the monitoring is started. As will be described later, during the monitoring, the radio waves emitted from the base unit 100 or the first handset 201 are received by the antenna 53 of the second handset 202, which measures the strength of the received radio waves. Then, from the result of the measurement, the second handset 202 computes the distance between the base unit 100 and the second handset 202, for example, and when the distance is larger than a predetermined distance (hereinafter, this distance will be referred to as a "supervision distance"), a predetermined safety management action such as outputting of a ringing sound is performed.

The base unit 100 has an antenna (base unit antenna) 5, and transmits and receives digital audio data superimposed on a carrier wave having a predetermined frequency to and from an antenna (first handset antenna) 13 provided to the first handset 201 or an antenna (second handset antenna) 53 provided to the second handset 202. In this way, wireless communication can be performed between the base unit 100 and the first handset 201 or the second handset 202. Similarly, digital audio data is also communicated between the first handset 201 and the second handset 202 mentioned above.

Figure 3:
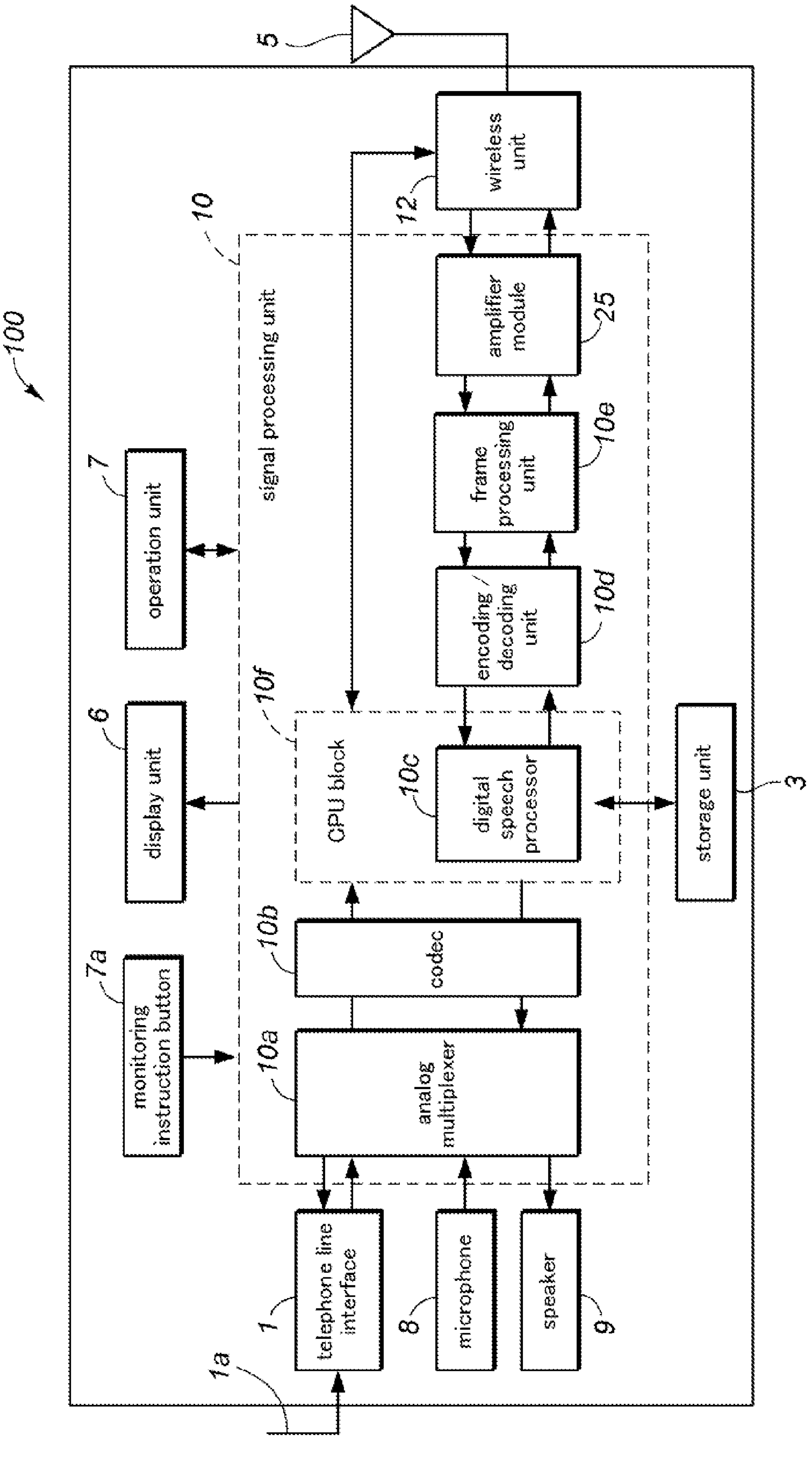
FIG. 3 is a block diagram showing a general structure of the base unit of the cordless telephone system.

FIG. 3 is a block diagram showing a general structure of the base unit 100 of the cordless telephone system. In addition to the above-described display unit 6, operation unit 7, monitoring instruction button 7*a*, microphone 8 and speaker 9, which serve as a user interface, and the antenna 5, the base unit 100 includes a telephone line interface 1 serving as an external interface such that the base unit 100 connects to the public telephone line via the telephone line interface 1 and the telephone line la. Further, the base unit 100 is provided with a storage unit 3, which may be embodied as a flash memory or the like, to store frequently accessed telephone numbers, for example. When the base unit 100 is used as an answering machine, the storage unit 3 may store the transmitted audio signal after the signal is converted into digital form. Further, the storage unit 3 stores data of alarm sound, voice message or the like to be output from the speaker 9 when, after monitoring is started, the distance between the second handset 202 and the base unit 100 or the like becomes larger than the "supervision distance" (hereinafter, this state will be simply referred to as an "abnormal state." The state that is not an abnormal state will be referred to as a "normal state." Further, detection of the distance between the second handset 202 and the reference unit such as the base unit 100 becoming larger than the "supervision distance" may be expressed as "detection of an abnormality.").

The base unit 100 further includes a signal processing unit (control unit) 10, and the signal processing unit 10 includes an analog multiplexer 10*a*, a codec 10*b*, a CPU block 10*f*, an encoding/decoding unit 10*d*, a frame processing unit 10*e*, a digital speech processor (speech processing unit) 10*c* mounted on the CPU block 10*f*, and an amplifier module 25. In the following, description will be given of the structural elements of the signal processing unit 10. The signal processing unit 10 serves as a control unit to control the entirety of the base unit 100. For example, the signal processing unit 10 (CPU block 10*f*) determines whether the aforementioned monitoring instruction button 7*a* is pressed by polling. In the following, description will be made of the structural elements of the signal processing unit 10.

The analog multiplexer 10*a* selects one of the input/output channels used for the audio signal input via the telephone line interface 1, the audio signal received by the microphone 8, and the audio signal output to the speaker 9, where each of the audio signals is an analog signal.

The codec 10*b* is a so-called audio codec, and specifically is formed of a DA converter and an AD converter performing conversion between digital and analog signals. An analog audio signal input to the base unit 100 by the codec 10*b* via the telephone line interface 1 and an analog audio signal acquired by the microphone 8 are converted into digital audio signals by the AD converter. On the other hand, digital audio signal processed digitally by the digital speech processor 10*c*, which will be described later, is converted by the DA converter of the codec 10*b* into an analog audio signal, which is output from the speaker 9.

Though not shown in the drawings, the CPU block 10*f* includes a CPU (Central Processing Unit), an EEPROM (Electrically Erasable Programmable Read Only Memory) storing a control program, a RAM (random access memory) serving as a work memory, and a bass connecting these component elements, and controls the overall operation of the base unit 100. Further, the CPU block 10*f* includes the digital speech processor 10*c* which processes audio signals. The digital speech processor 10*c* performs noise/echo cancellation, enhancement of specific audio frequencies, encryption/description, etc. on the digital audio signal obtained through AD conversion performed by the codec 10*b* and/or the digital audio signal decoded by the later-described encoding/decoding unit 10*d*.

It is to be noted that these audio signal processings are often performed as filtering processes including convolution, and a DSP (Digital Signal Processor) or the like specifically designed to perform these signal processings may be used. Of course, the CPU not shown in the drawing and the digital speech processor 10*c* may be embodied in a single processor. Further, the entirety of the signal processing unit 10 may be embodied as a single DSP.

The encoding/decoding unit 10*d* encodes a digital signal included in an output from the digital speech processor 10*c* to be communicated (transmitted) wirelessly via the antenna 5, and decodes a signal (which is already digitized in this embodiment) received via the antenna 5. The encoding/decoding unit 10*d* adopts ADPCM (Adaptive Differential Pulse Code Modulation) techniques, for example.

The frame processing unit 10*e* includes a TDD/TDMA (Time Division Duplex/Time Division Multiple Access) processor not shown in the drawings. The TDD/TDMA processor divides each of the periodically occurring frames into units known as slots (channels), so that multiple communications can be performed on the same frequency (time division multiple access). Thus, transmission and reception can be performed in a very short time period by sharing the same frequency, and therefore, transmission and reception may appear to be performed substantially simultaneously. Further, TDMA may be used along with FDMA (Frequency Division Multiple Access) for allocating frequency bands (or channels), thereby to provide a large number of channels while avoiding interferences between frequencies. The frame processing unit 10*e* switches between transmission (Tx) and reception (Rx) periodically in a short period of time. The structure of the frames used in DECT will be described later.

The switching between transmission and reception may be achieved by controlling the power supply to the amplifiers (not shown in the drawings) included in a wireless unit 12 performing modulation and demodulation or by controlling a gate circuit provided in an input stage or an output stage of each amplifier.

Further, the frame processing unit 10*e* includes therein a DA converter and an AD converter not shown in the drawings. The frame processing unit 10*e* converts with the DA converter a digital signal (transmission signal) input from the digital speech processor 10*c* via the coding/decoding unit 10*d* into an analog signal and outputs the analog signal to the amplifier module 25, and converts with the AD converter an analog signal (received signal) input from the wireless unit 12 via the amplifier module 25 into a digital signal and outputs the digital signal to the coding/decoding unit 10*d*. Thus, an analog signal interface including the amplifier module 25 is provided between the frame processing unit 10*e* and the wireless unit 12.

The wireless unit 12 includes a transmission circuit (not shown in the drawings) through which the transmission signal (analog signal) output from the amplifier module 25 is passed to the antenna 5 for emission. Further, the wireless unit 12 includes a reception circuit (not shown in the drawings) through which the received signal (analog signal) received by the antenna 5 is output to the amplifier module 25.

Figure 4:
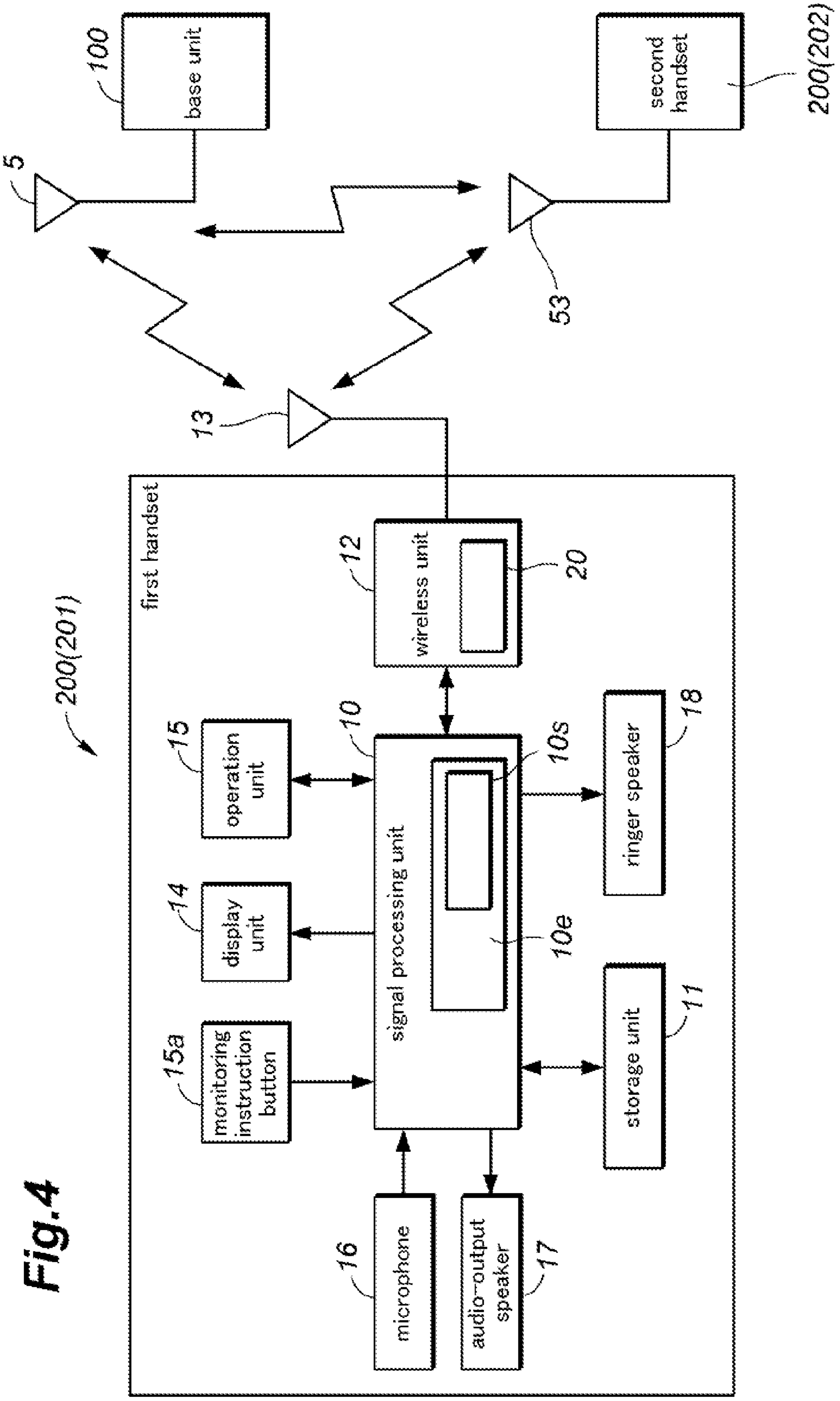
FIG. 4 is a block diagram showing a general structure of the first handset of the cordless telephone system.

FIG. 4 is a block diagram showing a general structure of the first handset 201 of the cordless telephone system. As described in the foregoing with reference to FIG. 2B, the first handset 201 includes a display unit 14 for displaying the telephone number of an incoming call or the telephone number input when the user makes a call, an operation unit 15 for allowing the user to input a telephone number or the like, a monitoring instruction button 15*a* for allowing the user to instruct start of monitoring, a microphone 16 for capturing the user's voice, an audio-output speaker 17 for outputting the voice of the person on the other end of the line regenerated from the received signal, and a ringer speaker 18. Further, the first handset 201 includes a storage unit 11 storing speed dial data, audio guide data, data of alarm sound, voice message or the like to be output from the audio-output speaker 17 when an abnormality is detected, an antenna 13 for transmitting and receiving radio waves to and from the base unit 100 or another handset 200 (the second handset 202), a signal processing unit 10, and a wireless unit 12.

The first handset 201 is generally designed to be compact in size so as to be portable, but the basic functions thereof are substantially the same as those of the base unit 100 described above with reference to FIG. 3. Namely, the structure and function of the signal processing unit 10 and the wireless unit 12 of the first handset 201 are substantially the same as those of the signal processing unit 10 and the wireless unit 12 of the base unit 100 described above. (for this reason, the same reference numerals are used). Therefore, detailed description of these component parts of the first handset 201 will be omitted.

It is to be noted, however, that the frame processing unit 10*e* of the signal processing unit 10 in the first handset 201 is provided with a synchronization control unit 10*s*. The synchronization control unit 10*s* functions to match the reception timing of the first handset 201 with the transmission timing of the base unit 100. Specifically, when the first handset 201 is turned on, for example, the first handset 201 autonomously performs reception operation periodically at a predetermined reception timing, and during such operation, when the synchronization control unit 10*s* receives from the base unit 100 a synchronization request that includes data representing a difference between the timing at which the synchronization request is transmitted and the timing with which the reception timing in the first handset 201 should be synchronized, the synchronization control unit 10*s* adjusts the reception timing so as to eliminate the difference, and the frame processing unit 10*e* controls the hardware relating to signal processing in accordance with the adjusted reception timing. Thereby, the reception timing of the first handset 201 can be adjusted to coincide with the transmission timing (or time slot for transmission in each frame) used by the base unit 100 in transmission designating the first handset 201. Further, the wireless unit 12 of the first handset 201 is provided with a radio wave strength measurement unit 20, which will be described in detail later.

Figure 5:
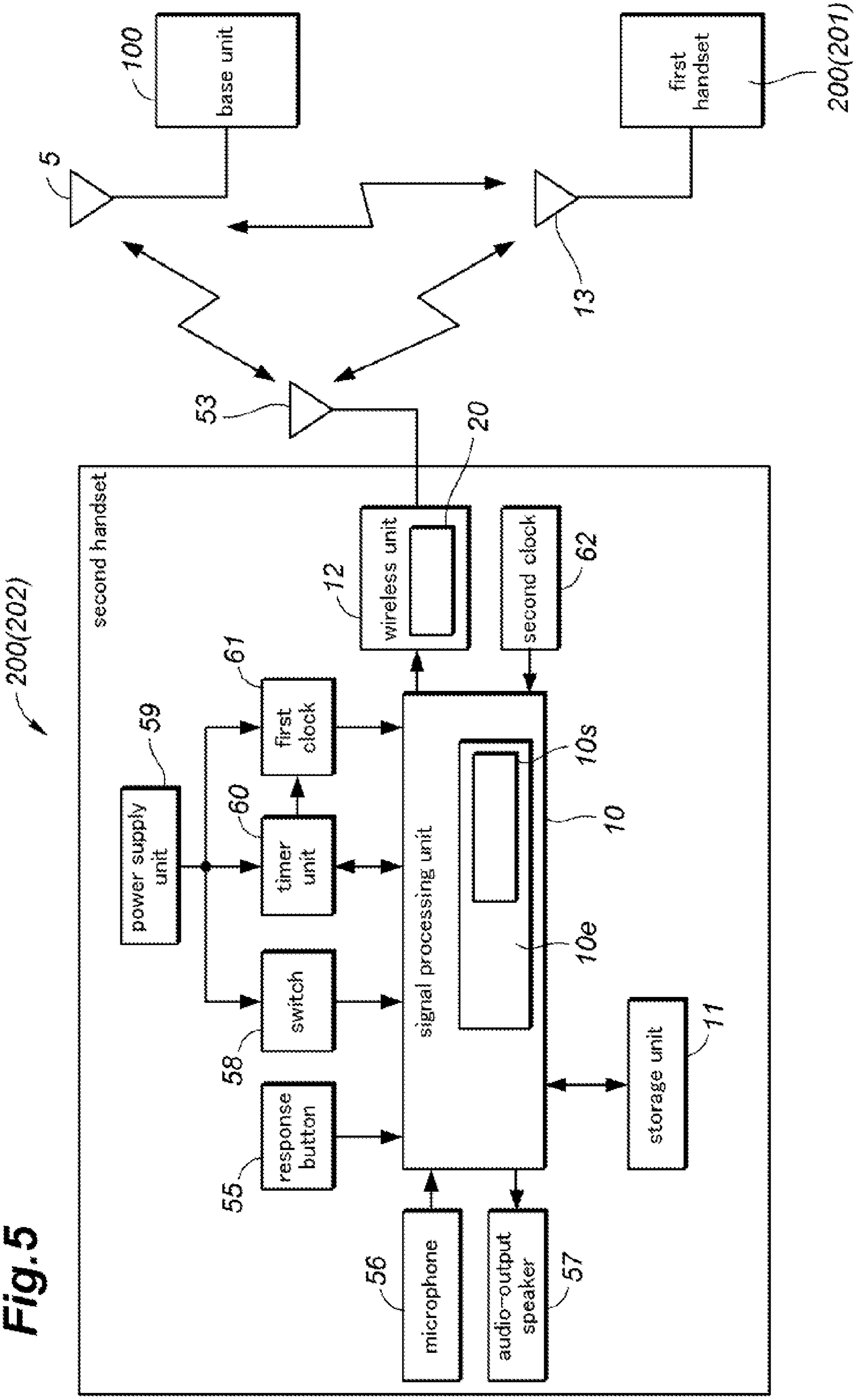
FIG. 5 is a block diagram showing a general structure of the second handset of the cordless telephone system.

FIG. 5 is a block diagram showing a general structure of the second handset 202 of the cordless telephone system. As described above with reference to FIG. 2C, the second handset 202 includes the microphone 56, audio-output speaker 57, response button 55, antenna 53 and switch 58. The second handset 202 further includes a storage unit 11, a wireless unit 12, a power supply unit 59, a timer unit 60, a first clock 61, a second clock 62, and a signal processing unit 10. The structure of the signal processing unit 10 and the wireless unit 12 of the second handset 202 is substantially the same as that of the signal processing unit 10 and the wireless unit 12 of the first handset 201.

The power supply unit 59 includes a rechargeable battery not shown in the drawings, and the power supply voltage is supplied to the various parts of the second handset 202 via the switch 58. In the second handset 202, during a phone call, the operation timing of the hardware embodying the signal processing unit 10 is controlled based on the clock signal output from the second clock 62. On the other hand, in the standby mode immediately after the switch 58 is turned on, the clock signal output from the first clock 61 is used. The clock signal output from the first clock 61 has a lower frequency than that of the clock signal output from the second clock 62 that is used during a phone call (namely, the first clock 61 is a low-speed clock). Further, in the standby mode, the signal processing unit 10 sets a frequency division rate in the timer unit 60, such that the clock signal of the first clock 61 or the clock signal obtained by frequency dividing the clock signal of the first clock 61 is output to the signal processing unit 10. Thus, by lowering the clock signal frequency, the second handset 202 minimizes the consumption of power from the battery. Further, as will be described later, the reception period in the second handset 202 is set such that reception is performed less frequently in the standby mode than during a phone call, and this also contribute to reducing the power consumption. Similarly to the first handset 201, the wireless unit 12 of the second handset 202 also is equipped with a radio wave strength measurement unit (strength measurement unit) 20.

Figure 6:
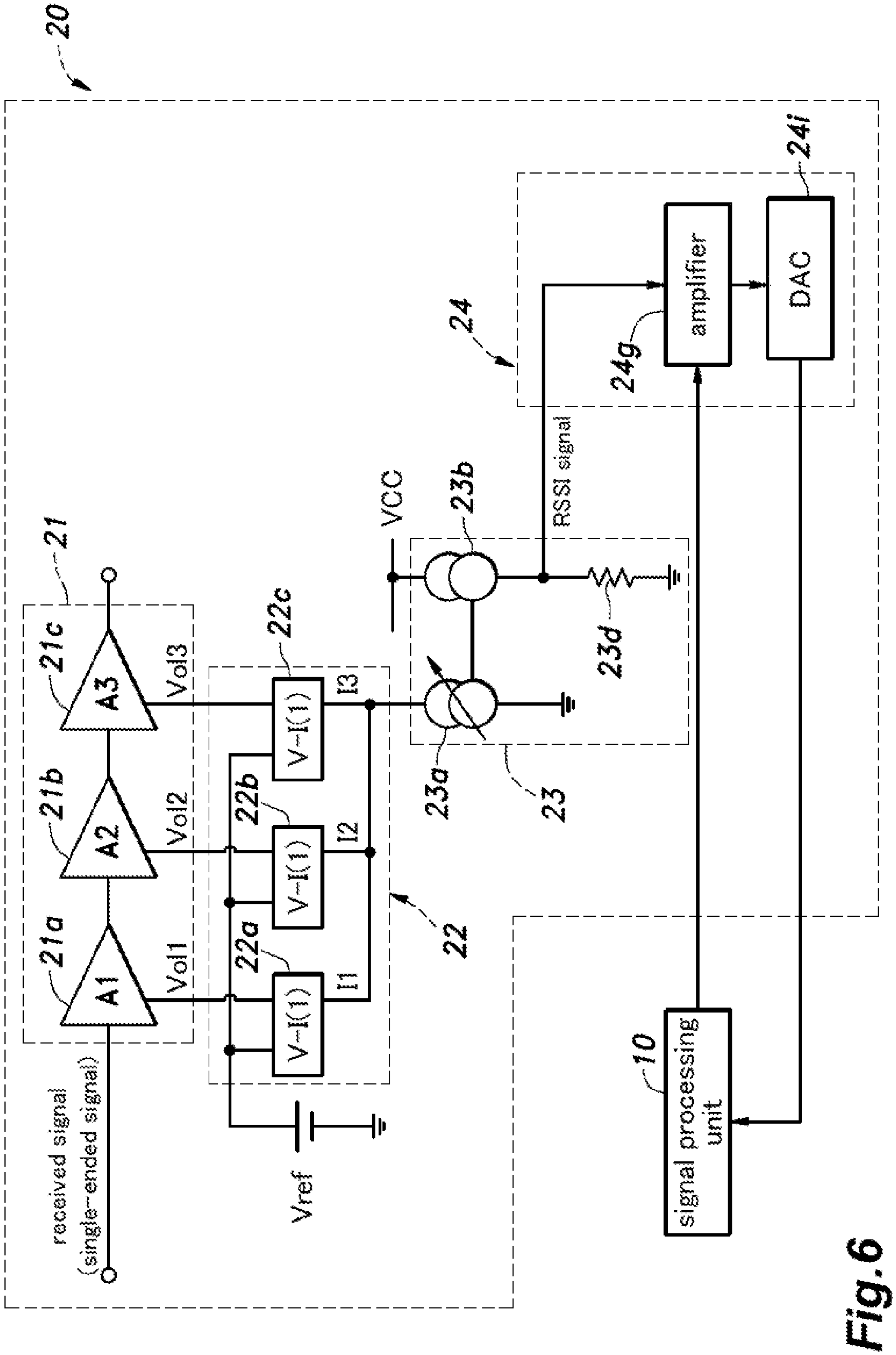
FIG. 6 is a diagram showing a structure of a radio wave strength measurement unit.

FIG. 6 is a diagram showing a structure of the radio wave strength measurement unit 20. As shown in FIG. 6, the radio wave strength measurement unit 20 in the first embodiment includes a limiter amplifier unit 21, a V-I conversion unit 22, a current mirror circuit 23 and a digital RSSI signal generation unit 23.

The limiter amplifier unit 21 is formed of three stage limiter amplifiers 21*a*, 21*b* and 21*c* that perform amplitude limitation and rectification. The received signal (e.g., a single-ended signal after demodulation) input to the limiter amplifier 21*a* is amplified in stages by the limiter amplifiers 21*a*, 21*b* and 21*c*. Then, rectified voltage signals Vol1, Vol2 and Vol3 output from the limiter amplifiers 21*a*, 21*b* and 21*c*, respectively, are converted into current signals I1, I2 and I3 by V-I converters 22*a*, 22*b* and 22*c* corresponding to the respective rectified voltage signals and constituting the V-I conversion unit 22.

A total current signal obtained by adding up the current signals I1, I2 and I3 is converted into an analog voltage signal by a first current source 23*a*, a second current source 23*b* that forms the current mirror circuit 23 jointly with the first current source 23*a*, and a resistor 23*d* connected to the second current source 23*b*, whereby a reception power RSSI signal (hereinafter simply referred to as "RSSI signal") is obtained.

An "RSSI (Received Signal Strength Indicator)" may refer to a circuit for measuring the strength of a signal received by a wireless communication device of a cordless telephone system or the like or a measurement of the power of the received signal, and is used herein as an indicator representing the strength of the received radio waves. In this description, the RSSI signal represents an amount of power in decibels referenced to 1 (one) mW (i.e., 1 mW=0 dB), whose abbreviation generally is dBm.

The digital RSSI signal generation unit 24 includes an amplifier 24*g* and an AD convertor 24*i*. The RSSI signal amplified by the amplifier 24*g* is input to the AD converter 24*i*, which quantizes the input RSSI signal to about 10 to 16 bits, for example, and outputs a digital RSSI signal. The digital RSSI signal is input into the signal processing unit 10, and a representation of the radio wave strength is displayed on the display unit 6 of the base unit 100 and/or the display unit 14 of the first handset 201. Further, the digital RSSI signal is used in the monitoring described in the following.

Figure 7:
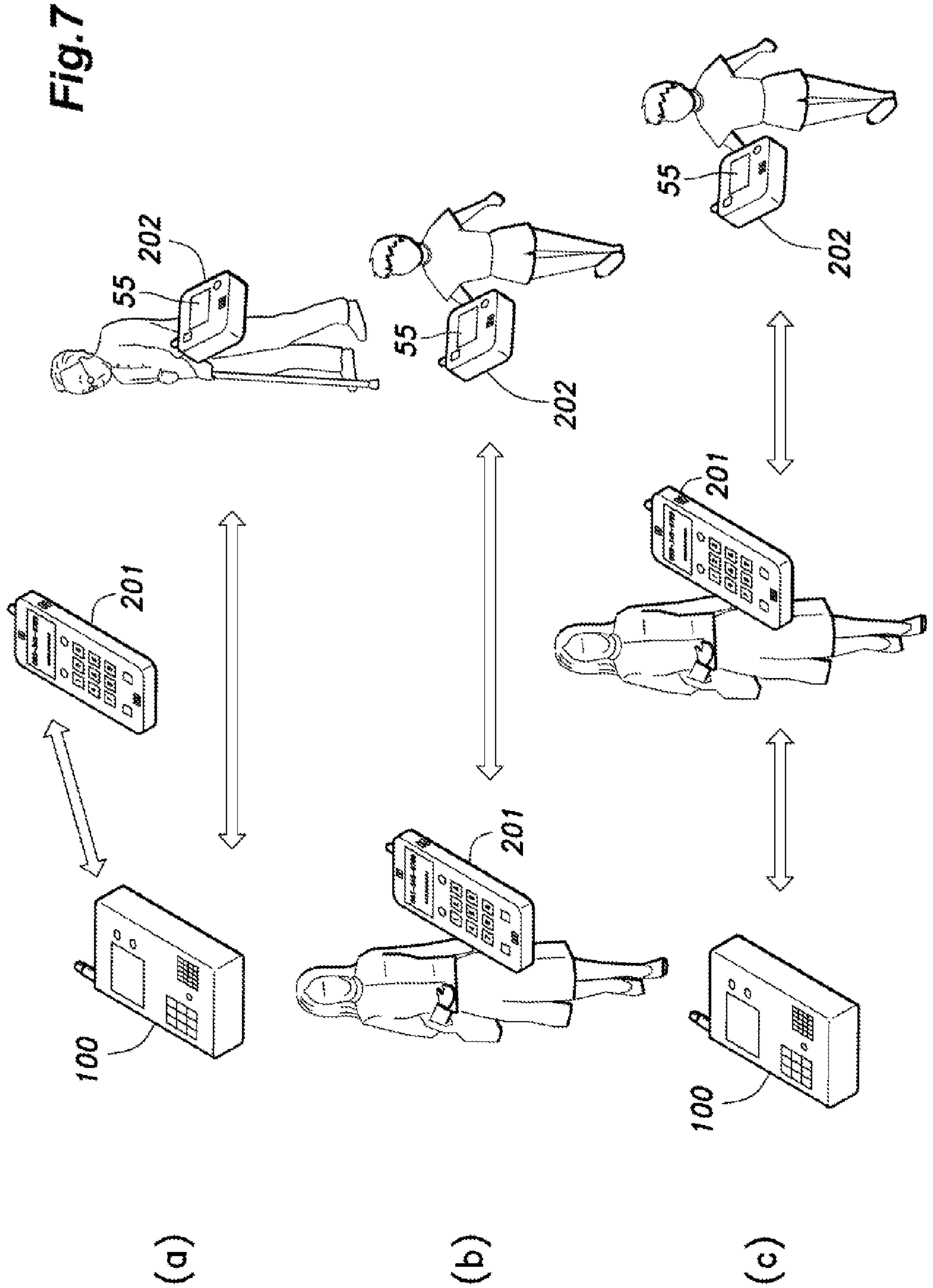
FIGS. 7A, 7B and 7C are each an explanatory diagram for explaining a concrete mode of safety management using the cordless telephone system.

FIGS. 7A, 7B and 7C are each an explanatory diagram for explaining a concrete mode of safety management using the cordless telephone system.

FIG. 7A shows a situation in which both the first handset 201 and the second handset 202 are located where they can communication with the base unit 100 and the second handset 202 is not apart from the base unit 100 beyond the "supervision distance." Such a situation may occur when a person who needs supervision (such as a dementia patient) carrying the second handset 202 is in a house, and a supervisor of the patient (such as a person who lives with the patient) also is in the same house to take an appropriate action when wandering of the patient is detected. The second handset 202 receives the radio waves transmitted from the base unit 100 (transmission and reception timings will be described later), and the radio wave strength measurement unit 20 described in the foregoing measures the strength of the radio waves. Based on the result of the measurement, the second handset 202 measures the distance thereof from the base unit 100. If the measured distance is larger than a predetermined value (supervision distance), it is determined that an abnormality is detected, and the second handset 202 performs a safety management action. Specifically, the second handset 202 transmits a signal to the base unit 100 to notify that an abnormality is detected, and the base unit 100 performs a safety management action such as outputting of a predetermined sound such as a ringing sound. Further, the base unit 100 transmits a predetermined command to the first handset 201 to cause the first handset 201 to perform a safety management action such as outputting of a predetermined sound.

FIG. 7B shows a situation in which both the first handset 201 and the second handset 202 are outside the communication range of the base unit 100, and the second handset 202 is not apart from the first handset 201 beyond the "supervision distance" (and thus, can communication with the first handset 201). Such a situation may occur when a supervisor (such as a parent) carrying the first handset 201 goes out with a person who needs supervision (such as a child) carrying the second handset 202, where the parent observes (watches) the child so that the child does not go away from the parent beyond a certain distance. The second handset 202 receives the radio waves transmitted from the first handset 201, and the radio wave strength measurement unit 20 described in the foregoing measures the strength of the radio waves. Based on the result of the measurement, the second handset 202 measures the distance thereof from the first handset 201. If the measured distance is larger than the "supervision distance," it is determined that an abnormality is detected, and the second handset 202 performs a safety management action. Specifically, the second handset 202 transmits a signal to the first handset 201 to notify that an abnormality is detected, and the first handset 201 performs a safety management action such as outputting of a ringing sound.

FIG. 7C shows a situation in which the first handset 201 is located where it can communicate with the base unit 100 while the second handset 202 is outside the communication range of the base unit 100 but is not apart from the first handset 201 beyond the "supervision distance" (and thus, can communicate with the first handset 201). The second handset 202 receives the radio waves transmitted from the first handset 201, and the radio wave strength measurement unit 20 described in the foregoing measures the strength of the radio waves. Based on the result of the measurement, the second handset 202 measures the distance thereof from the first handset 201. If the measured distance is larger than the "supervision distance," it is determined that an abnormality is detected, and the second handset 202 performs a safety management action. Specifically, the second handset 202 transmits a signal to the first handset 201 to notify that an abnormality is detected, and the first handset 201 performs a safety management action such as outputting of a ringing sound. Further, the first handset 201, which is located where it can communicate with the base unit 100, notifies the base unit 100 that an abnormality is detected by the second handset 202. In response to this, the base unit 100 also performs a safety management action such as outputting of a predetermined sound. Thereby, it is possible to perform the monitoring indirectly from the location where the base unit 100 is fixedly disposed, and this is virtually the same as increasing the "supervision distance."

It is to be noted that in the example shown in FIG. 7A, the base unit 100 may place a phone call to the second handset 202, and in the examples shown in FIGS. 7B and 7C, the first handset 201 may place a phone call to the second handset 202. If the response button 55 of the second handset 202 receiving the incoming call is pressed, a phone call is established between the second handset 202 and the base unit 100 or the first handset 201. Further, the second handset 202 can place a phone call to the base unit 100 or the first handset 201 in response to pressing of the response button 55 when there is no incoming call. It is to be noted here that the base unit 100 (the first handset 201) and the second handset 202 are configured to be capable of communicating with each other even when they are apart from each other beyond the "supervision distance" by a certain distance. In other words, the "supervision distance" is set smaller than the maximum distance at which the base unit 100 (the first handset 201) and the second handset 202 can communicate with each other.

Figure 8:
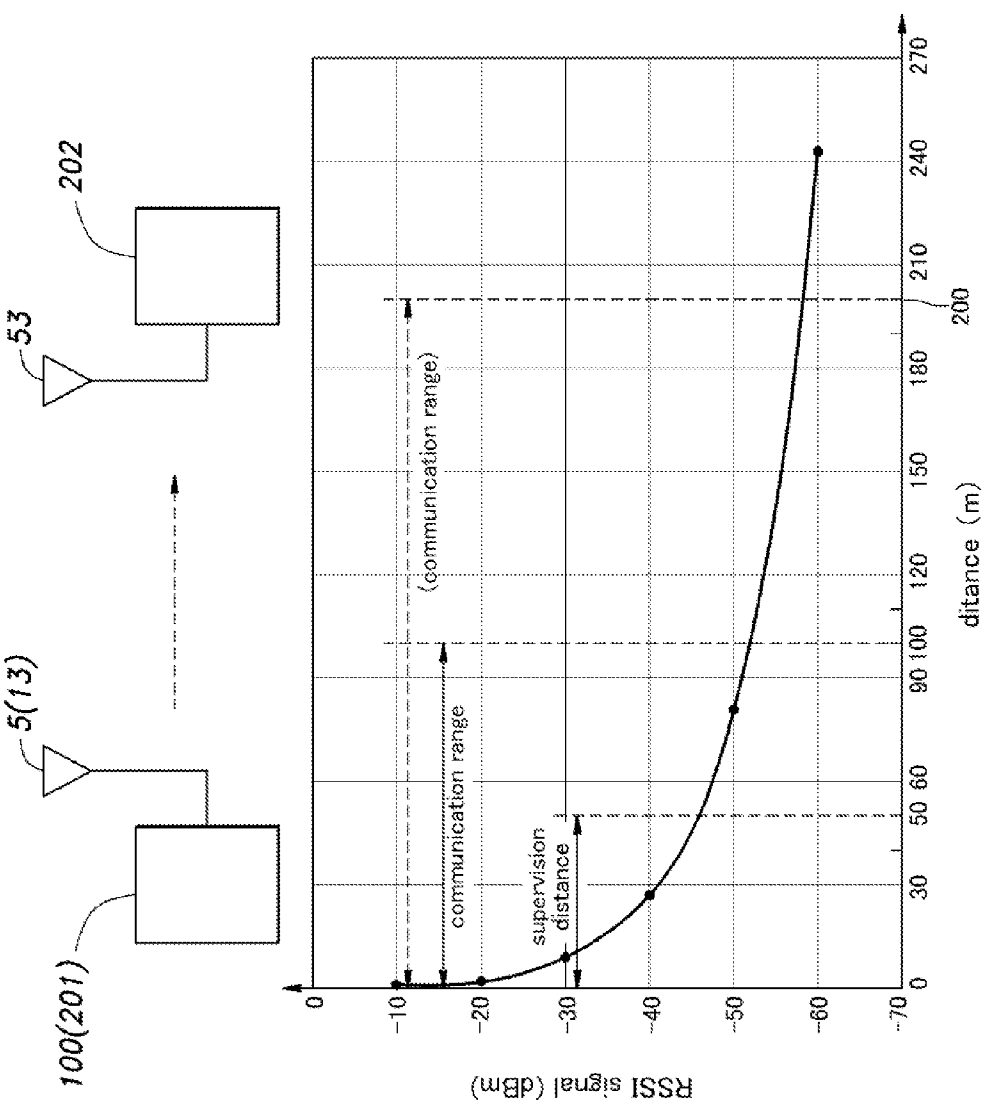
FIG. 8 is a graph showing a relationship between the RSSI signal obtained by the second handset and the distance between the base unit (or first handset) and the second handset.

FIG. 8 is a graph showing a relationship between the RSSI signal obtained by the second handset 202 and the distance between the base unit 100 (or first handset 201) and the second handset 202. The graph of FIG. 8 is obtained by plotting the RSSI signal output from the radio wave strength measurement unit 20 of the second handset 202 while gradually changing the distance between the base unit 100 (first handset 201) and the second handset 202 in a state where the base unit 100 (first handset 201) transmits radio waves from the antenna 5 (antenna 13) (thus, serving as a transmitting unit) and the second handset 202 receives the radio waves by means of the antenna 53 (thus, serving as a receiving unit). In the graph shown in FIG. 8, each grid line on the horizontal axis represents one meter, and the vertical axis represents the signal strength of the RSSI signal [dBm].

As shown in FIG. 8, as the distance between the base unit 100 and the second handset 202 increases, the RSSI signal decreases. Provided that the power emitted from the antenna 5 of the base unit 100 is represented by P, the RSSI signal (reception power) by Pr, the distance between the base unit 100 (transmitting side) and the second handset 202 (receiving side) by r, and the effective opening area of the receiving side antenna 53 by Ae, there is a following relationship between them:

$$Pr=P/4\pi r^2\cdot Ae \qquad \text{(Equation 1)}$$

Namely, the reception power Pr is equal to the radio wave density, $P/4\ \pi r^2$, multiplied by the effective opening area Ae, and thus, is inversely proportional to the square of the distance.

Concretely, as shown by a solid line in FIG. 8, the RSSI signal has a value on the order of −10 dBm when the distance between the base unit 100 and the second handset 202 (or between the first handset 201 and the second handset 202) is 1 m, a value on the order of −20 dBm when the distance is 3 m, a value on the order of −30 dBm when the distance is 9 m, a value on the order of −40 dBm when the distance is 27 m, a value on the order of −50 dBm when the distance is 81 m, and a value on the order of −50 dBm when the distance is 243 m. This relationship between the RSSI signal and the distance is stored as an LUT (lookup table) in the storage unit 11 of each handset 200 (see FIG. 4 and FIG. 5), and the signal processing unit 10 measures the distance between the base unit 100 and the second handset 202 or between the two handsets 200 from the digital RSSI signal by referring to the LUT.

In general, the maximum distance at which the phone call (or wireless communication) between the base unit 100 and the handset 200 (the first handset 201 or the second handset 202) is possible (i.e., they are within the communication range) is about 100 m (under a certain optimum condition where there is no obstacle therebetween, the distance may be extended to about 200 m). In the first embodiment, the "supervision distance" is set at about 50 m. Namely, in the first embodiment, when the RSSI signal reduces below about −45 dBm, it is determined that the person who needs supervision is apart from the supervisor by 50 m or more and an abnormality is detected as a result of the monitoring. Since the "supervision distance" is set smaller than the maximum distance at which the wireless communication is possible, it is ensured that, even when an abnormality is detected, a phone call can be made between the base unit 100 and the second handset 202, for example, so that when, for example, a child goes away from its parent beyond the "supervision distance," the parent can talk with the child over the phone to confirm the safety of the child.

In the examples described above, the base unit 100 and/or the first handset 201 performs a safety management action such as outputting of a ringing sound when the second handset 202 moves away therefrom by a distance larger than the "supervision distance." However, as will be described later, the measurement of the distance is performed periodically at an interval of 10 ms and the second handset 202 can transmit the measured distance to the first handset 201 or the like, such that the first handset 201 or the like can recognize the distance to the second handset 202 substantially in real-time. Therefore, the measured distance can be successively displayed on the display unit 14 of the first handset 201 or the like (see FIG. 4). so that the distance can be monitored more closely.

Figure 9:
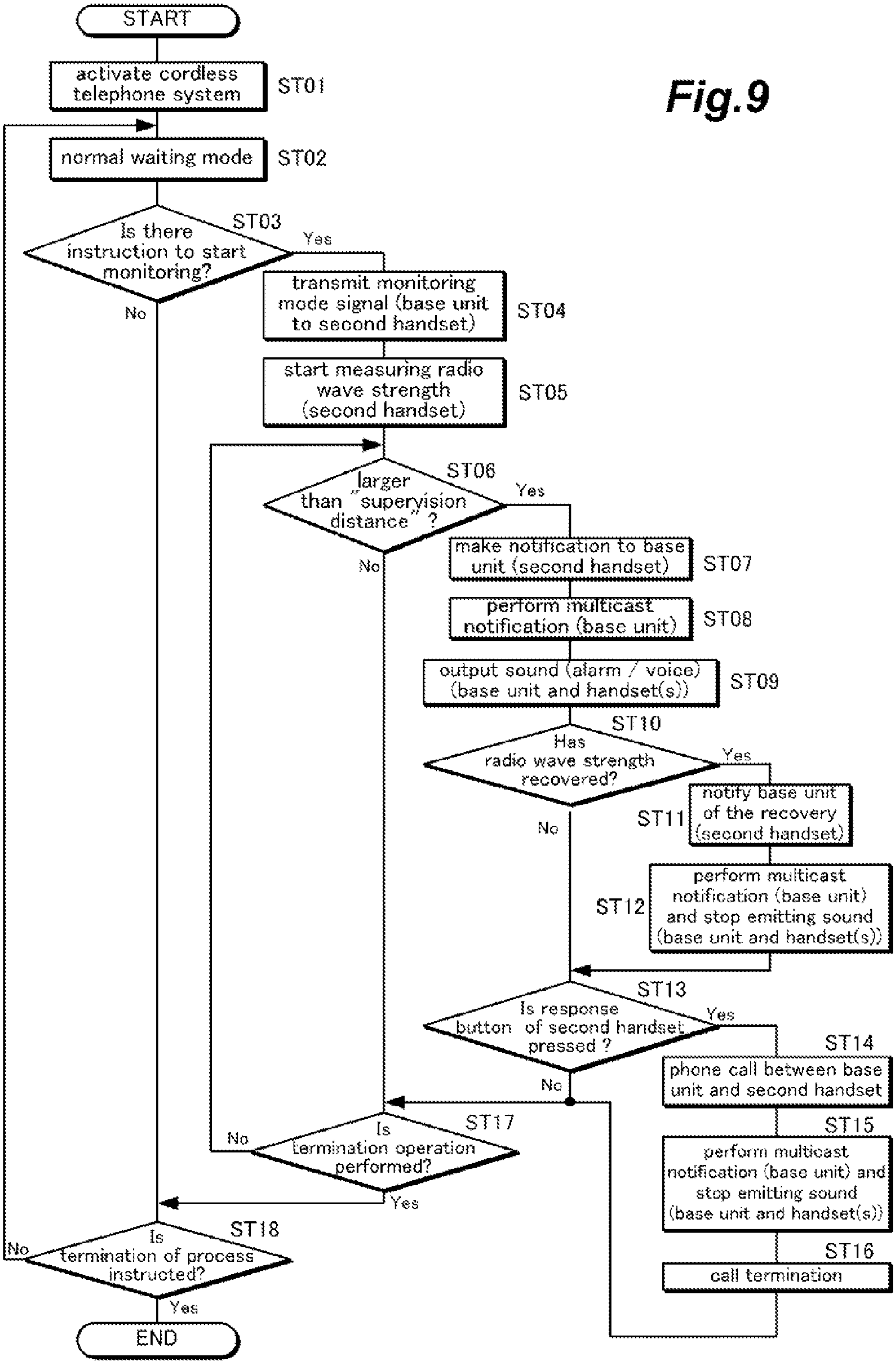
FIG. 9 is a flowchart showing a flow of a process relating to a safety management action.

FIG. 9 is a flowchart showing a flow of a process relating to a safety management action. In the cordless telephone system according to the first embodiment, a prescribed safety management action is performed upon detection of an abnormality. In the following, with reference to FIG. 9 together with FIGS. 3, 5 and 6, description will be made of a process relating to the safety management action. It is to be noted that the following description assumes the situation shown in FIG. 7A.

Upon activation of the cordless telephone system (i.e., when the base unit 100 and the handsets 200 are turned on), the signal processing unit 10 of each of the base unit 100 and the handsets 200 executes an initialization process (ST01), and then each of the base unit 100 and the handsets 200 enters a normal standby mode (ST02). During the initialization process, each of the two handsets 200 adjusts its reception timing to be in synchronization with a control slot (described in detail later), namely, a time period in each frame in which control data is transmitted from the base unit 100.

In the normal standby mode, the signal processing unit 10 (CPU block **10*f*) of the base unit 100 detects whether the monitoring instruction button 7*a* is pressed and determines whether the start of monitoring is instructed (ST03). If the user presses the monitoring instruction button 7*a* of the base unit 100, the signal processing unit 10 determines that the start of monitoring is instructed (Yes in step ST03**), and accordingly monitoring is started.

It is to be noted that, in the following description, if not mentioned otherwise, the signal processing unit 10, wireless unit 12, and radio wave strength measurement unit 20 will be those of the handset 200. When description is made of the signal processing unit 10, etc. of the base unit 100, it will be mentioned by using such expression as "the signal processing unit 10 of the base unit 100."

At the start of monitoring, the base unit 100 sends a "command instructing the execution of monitoring" (hereinafter referred to as a "monitoring mode signal") to the second handset 202 using the control slot (ST04). The wireless unit 12 receives the "monitoring mode signal" and then notifies the signal processing unit 10 that the monitoring mode signal is received. Upon receipt of the notification, the signal processing unit 10 acquires a digital RSSI signal from the AD converter **24*i* (see FIG. 6) in the radio wave strength measurement unit 20 provided to the wireless unit 12, and begins measurement of the distance between the base unit 100 and the second handset 202 (ST05**).

It is to be noted that actual base units 100 and handsets 200 for forming cordless telephone systems have varying sensitivities, and thus, the value of the digital RSSI signal for a given distance between the base unit 100 and the handset 200 may vary. The relationship between the value of the digital RSSI signal and the distance between the base unit 100 and the handset 200 is adjusted in the factory and stored in the storage unit 11 in the form of an LUT (see FIG. 5), but a user can calibrate it after the shipment. Namely, the user can update the content of the LUT by setting the base unit 100 and the handset 200 to be apart from each other by a predetermined distance (e.g., 50 cm) and inputting a predetermined command through the operation unit 7 of the base unit 100 (see FIG. 3) in this state.

The measurement value (having a dimension of distance) of the distance between the base unit 100 and the second handset 202 is forwarded to the signal processing unit 10, which performs filtering in a time series manner. This filtering may be performed by use of a simple low-pass filter (to obtain simple average or simple moving average, for example), though the filtering may be performed by giving different weights to items of data to be averaged or by use of a median filter to obtain a center value. A median filter may be used in the field of image processing to remove falling snow from images, for example, and can remove impulse-like events that occur along the time axis.

After the filtering, the signal processing unit 10 compares the measurement value of the distance with a predetermined threshold value (aforementioned "supervision distance") (ST06). It is to be noted that the user can select the "supervision distance" from multiple predetermined values such as, 10 m, 20 m, 30 m, and so on. The selection of the "supervision distance" may be performed by use of the operation unit 7 of the base unit 100 (see FIG. 3), for example, and the selected "supervision distance" is transmitted from the base unit 100 to the second handset 202 together with the aforementioned LUT via wireless channel.

If the measurement value of the distance is larger than the "supervision distance" (namely, the measured radio wave strength is smaller than a predetermined value) (Yes in step ST06), the second handset 202 determines that there is an abnormality and starts a safety management action. As the safety management action, the second handset 202 notifies the base unit 100 that an abnormality is detected (first notification. ST07). On the other hand, if the measurement value of the distance is smaller than or equal to the "supervision distance" (No in step ST07), the process goes to step ST17.

When notified from the second handset 202 that "an abnormality is detected," the base unit 100 itself performs a safety management action such as emitting of a ringing sound. Further, the base unit 100 performs a multicast notification to the first handset 201 and the second handset 202 (second notification. ST08). This multicast notification is received by each of the first handset 201 and the second handset 202, and as a result, all of the base unit 100, the first handset 201 and the second handset 202 start emitting a ringing sound (ST09). It is to be noted that instead of a ringing sound, a voice message having a meaning may be used. Further, whether the emitting of a sound should be performed by the second handset 202 may be set by the base unit 100, for example.

Subsequently, the signal processing unit 10 determines whether the measurement value of the distance has become smaller than or equal to the "supervision distance," namely, whether the radio wave strength has recovered to a normal level (or becomes larger than the predetermined value again) (ST10). If it is determined that the radio wave strength has recovered to the normal level (Yes in step ST10), the second handset 202 transmits a "recovery notification" to the base unit 100 (ST11). On the other hand, if the measurement value of the distance is larger than "supervision distance", i.e., the radio wave strength has not recovered to the normal level, the process proceeds to step ST13.

Upon receipt of the recovery notification, the base unit 100 halts its own safety management action, and performs multicast notification to the first handset 201 and the second handset 202 to instruct halting of the safety management action. Consequently, the safety management action such as emitting of a ringing sound performed by the first handset 201 and the second handset 202 is halted (ST12).

In step ST13, the signal processing unit 10 determines whether the response button 55 of the second handset 202 is pressed (ST13). If it is determined that the response button 55 is pressed (Yes in step ST13), the second handset 202 makes a connection request to the base unit 100 and they start performing transmission and reception of audio data therebetween by including the audio data in the information data field 33 of the later described DECT frame, such that a phone call between the base unit 100 and the second handset 202 is started (ST14). After the phone call is started, the base unit 100 performs multicast notification to the first handset 201 and the second handset 202 to instruct halting of the safety management action (ST15). Thereby, the base unit 100, the first handset 201 and the second handset 202 each halt the emitting of a ringing sound or the like, that would otherwise interfere with the conversation over the phone. Thereafter, when the phone call is finished, a call termination process is executed and the transmission and reception between the base unit 100 and the second handset 201 with the audio data included in the information data field 33 is stopped (ST16). It is to be noted that in the DECT frame structure, the audio data and the "monitoring mode signal" are contained in different fields, and thus, the second handset 202 can perform the monitoring and the phone call function simultaneously. Thus, when an abnormality is detected with regard to a person who needs supervision, a supervisor can talk over the phone with the person who needs supervision while observing the approximate distance between them, to provide an appropriate guidance or the like to the person who needs supervision. In such an application, upon start of the call, the safety management action may be controlled to include turning on of LEDs indicating the distance between the base unit 100 and the second handset 202 (i.e., between the supervisor and the person who needs supervision) instead of outputting of a ringing sound, so that the ringing sound does not interfere with the conversation over the phone without entirely halting the safety management action.

Subsequently, the signal processing unit 10 determines whether a monitoring termination operation is performed (ST17). When the signal processing unit 10 of the base unit 100 detects pressing of the monitoring instruction button 7*a* while the monitoring is being performed, the signal processing unit 10 of the base unit 100 determines that an instruction to terminate the monitoring is input. Upon such detection, the signal processing unit 10 of the base unit 100 terminates the transmission of the "monitoring mode signal" (though the transmission of the control data in the periodically occurring control slot is not terminated, the bit string of the "monitoring mode signal" is deleted from the control data), and this allows the signal processing unit 10 of the handset 202 to recognize that the monitoring termination operation (pressing of the monitoring instruction button 7*a*) is performed. Upon recognition of performance of the operation instructing the termination of monitoring (Yes in step ST17), the second handset 202 stops the aforementioned comparison of the measurement value of the distance and the "supervision distance" (ST10) to terminate the monitoring and the process goes to step ST18.

On the other hand, when the monitoring termination operation is not performed (No in step ST17), the process goes back to step ST06 and the above-described monitoring is continued.

After the termination of the monitoring (Yes in step ST17), the signal processing unit 10 determines whether instruction of terminating the process is input by detecting turning off of the power switch of the second handset 202, for example (ST18). If the turning off of the power switch is detected (Yes in step ST18), the second handset 202 terminates the program, and if not (No in step ST18), the process returns to step ST02.

In the foregoing description, the safety management action was described as outputting of a ringing sound. However, the safety management action does not have to be limited to outputting of a ringing sound or a voice message, and may include other processes. For example, the safety management action may include a process of calling one or more telephone numbers pre-stored in the storage unit 11 of the second handset 202, where the pre-stored telephone numbers may include that of a security company, for example. And when there is an answer to the phone call, the audio-output speaker 57 and the microphone 56 of the second handset 202 (see FIG. 5) may be activated to allow the handset to function as a so-called speaker phone, so that the person on the other end of the telephone line (e.g., a security company staff member) can hear the sound generated around the second handset 202, which may help the person understand the situation. Further, it is possible to first emit an alarm such as a ringing sound upon detection of an abnormality, and when the abnormality continues to be detected for a predetermined time period thereafter, to make a notification to the security company; namely, the safety management action may be performed in multiple stages. Thereby, it is possible to avoid making an unnecessary notification to the security company or the like.

Further, the safety management action may include a process of making notification via wireless channel. The "notification via wireless channel" here is the above-described notification from the second handset 200 to the base unit 100 or notification from one handset to another. When the base unit 100 is notified from the second handset 202 that an abnormality is detected, the base unit 100 itself may make a phone call(s) to a security company or the like. Further, the safety management action may include a process of notifying that an abnormality occurs by means of light or vibration. Specifically, it is possible to turn on or blink a predetermined LED(s) depending on the detected distance between the base unit 100 and the second handset 202 and/or change the vibration pattern depending on the detected distance. The safety management action is only required to include at least one of the various processes described above and may include two or more of these processes in combination.

It is to be noted that, instead of determining by the second handset 202 whether there is an abnormality based on the digital RSSI signal, the second handset 202 may transmit to the base unit 100 the values of the digital RSSI signal described above in response to the control data transmitted from the base unit 100 in the control slot, so that the determination whether there is an abnormality based on the digital RSSI signal measured by the second handset 202 is performed by the base unit 100.

Figure 10:
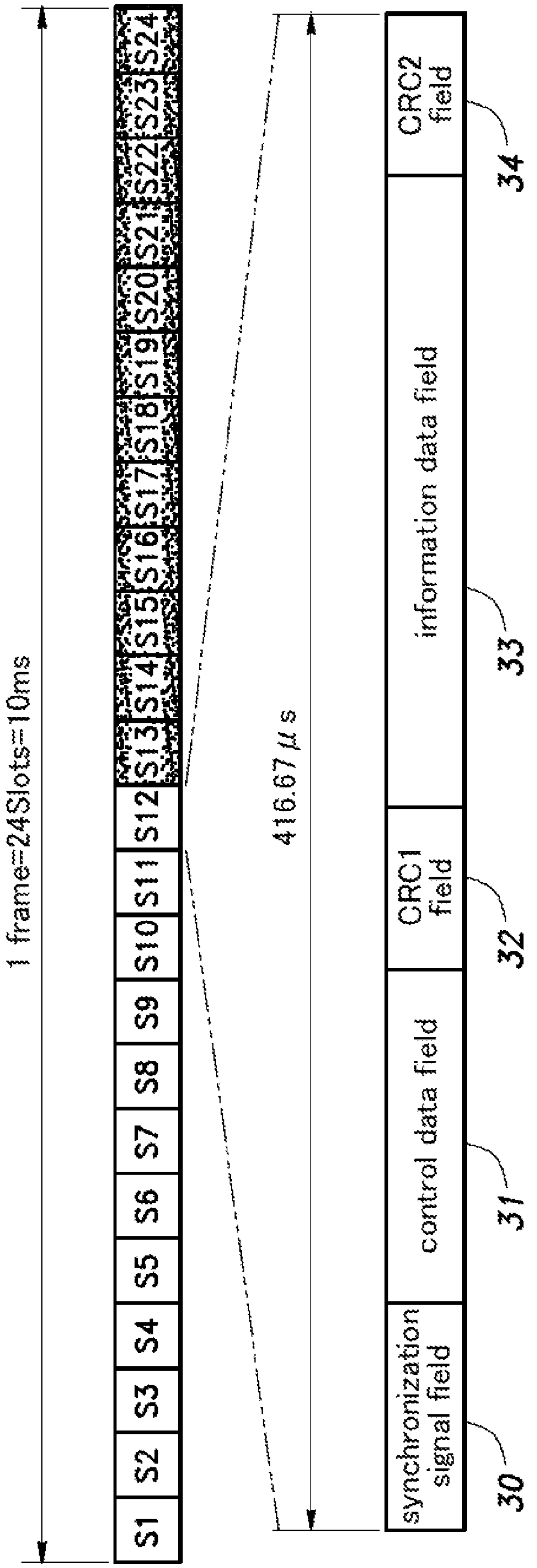
FIG. 10 is an explanatory diagram for explaining the frame structure of DECT.

FIG. 10 is an explanatory diagram for explaining the frame structure of DECT. In DECT, each frame is 10 ms in duration and includes twenty-four slots (twelve slots for up-link and twelve slots for down-link). Typically, slot 1 (S1) to slot 12 (S12) are used for the communication from the base unit 100 to the handsets 200, and slot 13 (S13) to slot 24 (S24) are used for the communication from the handsets 200 to the base unit 100. In the communication between the base unit 100 and the handsets 200, a pair of slots (slot pair) separated from each other by 5 ms, such as slot 1 (S1) and slot 13 (S13) or slot 2 (S2) and slot 14 (S14), are used as a single communication channel.

Of the twelve slots used for transmission from the base unit 100 to the handsets 200, at least one slot (e.g., slot 1 (S1)) is used as a control slot for transmitting control data. The control data is transmitted from the base unit 100 periodically using one slot in each frame while the base unit 100 is on. It is to be noted that radio wave interference may occur during transmission of control data from the base unit 100 to a certain handset 200, disabling the control slot therefor (e.g., slot 1 (S1)). In preparation for such an event, it is possible to monitor the status of idol slots (for example, when slot 1 (S1) is used as the control slot, slot 2 (S2) to slot 12 (S12)) to detect whether the idol slots are used by other units, such that when radio wave interference or the like actually occurs and slot 1 (S1) becomes unable to be used, a slot not in use (e.g., slot 2 (S2)) may be used as the control slot in place of slot 1 (S1). When the slot used as the control slot is changed from slot 1 (S1) to slot 2 (S2), the response slot corresponding to the control slot (a slot used for response to the control slot; namely, used in data transmission from the handset 200 to the base unit 100) is changed from slot 13 (S13) to slot 14 (S14). Thus, the slot used as the control slot can be variably determined depending on the circumstances.

Each slot has a width (duration) of 416.67 μs (=10 ms/24), and includes a synchronization signal field 30, a control data field 31, a CRC1 field 32, an information data field 33 and a CRC2 field 34 defined therein.

The synchronization signal field 30 contains fixed data constituted of a data string for achieving bit synchronization and a data string for achieving slot synchronization. The CRC1 field 32 is a field in which a CRC (Cyclic Redundancy Check) code calculated based on a data string in the control data field 31 is written to detect a transmission error in the control data field 31. Similarly, the CRC2 field 34 contains a CRC code for detecting a transmission error in the information data field 33. When an error is detected owing to the CRC, the handset 200 may request the base unit 100 to retransmit the data.

The control data field 31 (may be referred to as an A-field) is a field for transmitting, from the base unit 100 to the handsets 200, the control data necessary when making a phone call, when receiving an incoming call, while in the standby mode, etc. Specifically, the control data may include identification information (so-called ID) of the handset(s) 200 to which the control data is directed, data indicating the device performance, data indicating communication quality, data indicating presence of an incoming call, data indicating disconnection, data for retransmission control when a transmission error is detected, and so on. Further, the control data includes the aforementioned "monitoring mode signal." Therefore, by referring to the control data field 31 of the data received in the control slot, each handset 200 can acquire the control data and determine whether the execution of monitoring is instructed.

On the other hand, the information data field 33 (may be referred to as a B-field) is a field for containing a packet of audio data, image data or the like.

When audio data is communicated between the base unit 100 and any of the handsets 200, the audio data is written in the information data field 33. However, in the control slot, only the synchronization signal field 30, control data field 31 and CRC1 field 32 are effective and the information data field 33 and the CRC2 field 34 are not used. In other words, even when the cordless telephone system has no incoming call (or when the system is in the standby mode), the base unit 100 transmits control data to each handset 200 in the control slot allocated thereto in each frame period, and the handset 200 receives the control data. Further, the handset 200 transmits data, as necessary, to the base unit 100 using the response slot corresponding to the control slot. By using this structure, the handset 200 can transmit the data used for abnormality detection described above (e.g., the digital RSSI signal or the value indicating the distance obtained by converting the digital RSSI signal by use of the LUT) to the base unit 100.

Figure 11:
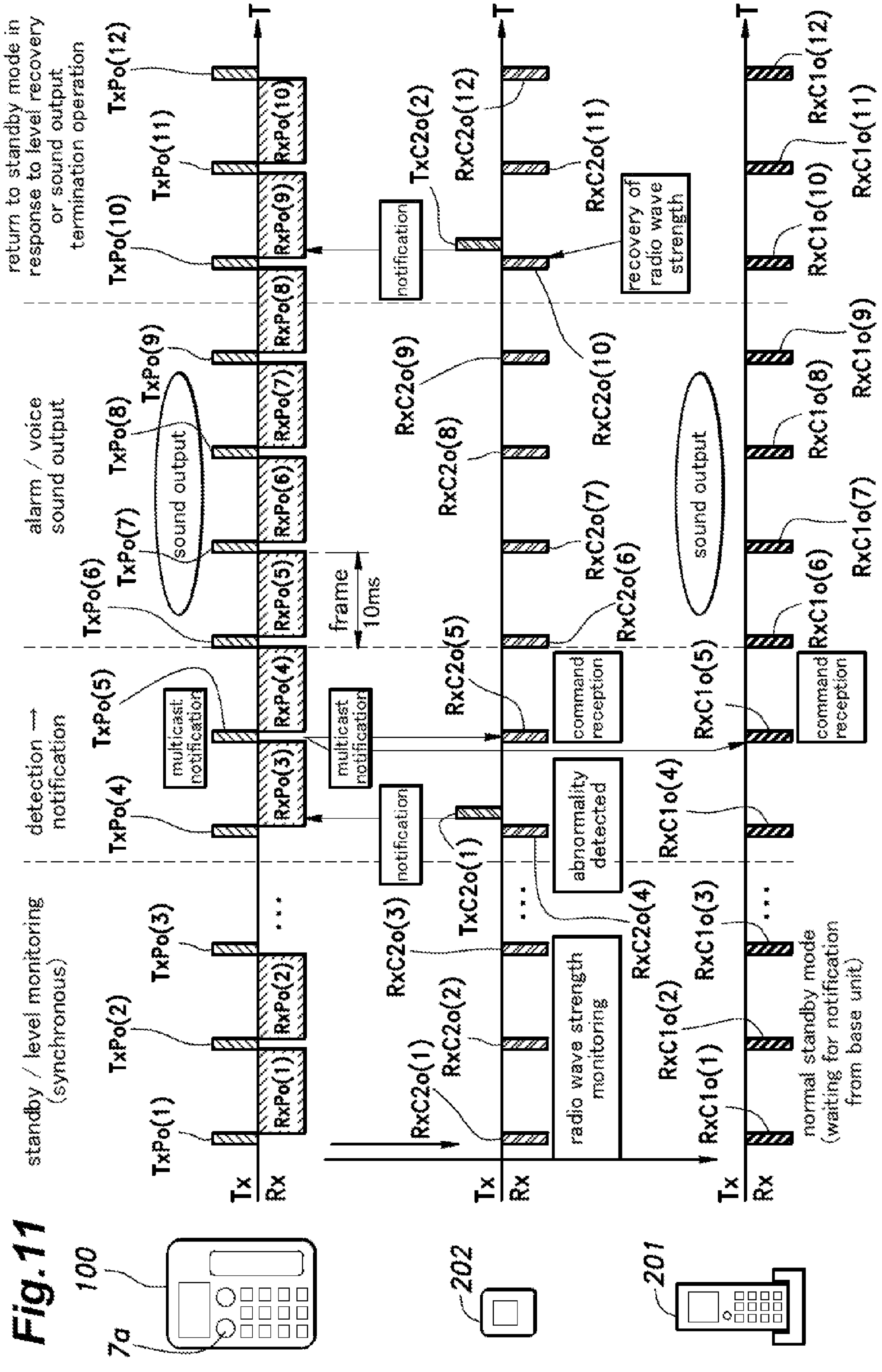
FIG. 11 is an explanatory diagram showing a mode of use of the slots used by the base unit, the first handset and the second handset of the cordless telephone system according to the first embodiment during execution of a process relating to the safety management action.

FIG. 11 is an explanatory diagram showing a mode of use of the slots used by the base unit 100, the first handset 201 and the second handset 202 during execution of a process relating to the safety management action in the cordless telephone system according to the first embodiment. In FIG. 11, initially the base unit 100 and the first handset 201 are in the normal standby mode, and the monitoring instruction button 7*a* of the base unit 100 is pressed in step ST03 of FIG. 9 to start the monitoring. It is to be noted that, as was described with reference to FIG. 10, the actual pair slots are separated from each other by 5 ms, but in FIG. 11, the slots are shown in a simplified manner (this applies to the second and later embodiments also).

During the monitoring, the transmission and reception between the base unit 100 and each of the first handset 201 and the second handset 202 are synchronized, in which the base unit 100 transmits control data in the control slot defined in each frame (10 ms) as a period TxPo(n) (n=1, 2, 3, . . . ; the same applies to the following description including that of the second embodiment and later embodiments), while the first handset 201 and the second handset 202 receive the control data in a period RxC1*o*(*n*) and a period RxC2*o*(*n*), respectively, which are in synchronization with the period TxPo(n). During this "standby/level monitoring (synchronous)," the control data includes the aforementioned "monitoring mode signal," and the second handset 202 monitors the digital RSSI signal, namely, the radio wave strength, and measures the distance between the base unit 100 and the second handset 202.

Thus, in the first embodiment, the control slot used to maintain synchronization between the base unit 100 and the handset 200 is also used to perform monitoring (namely, for measuring the RSSI signal). Specifically, by simply putting the "monitoring mode signal" in the control data (control data field 31) transmitted from the base unit, it is possible to have the handset 200 measure the RSSI signal and perform the monitoring, without need for the base unit 100 to set a special slot dedicated to performing the monitoring. The control slot, which is a time period in which to transmit the control data, is provided in each frame period (10 ms), and as a result, the measurement of the distance between the base unit 100 and the handset 200 is performed once for every 10 ms.

If, as a result of the monitoring, an abnormality is detected by the second handset 202 in a period RxC2*o*(4), in which the second handset 202 receives the control data transmitted in a period TxPo(4), the second handset 202 performs the safety management action described above in relation to step ST07 of FIG. 9. Namely, the second handset 202 transmits response data to the base unit 100 (first notification) in a period TxC2*o* (1), which is a response slot corresponding to the period RxC2*o*(4) (or TxPo(4)). The response data is received by the base unit 100 in a period RxPo(3) (precisely, it is not that the response data is received throughout the duration of the period RxPo(3) but that the response data is received in the slot delayed from the control slot by 5 ms). The response data also includes the control data field 31, and data indicating the detection of an abnormality is written in this control data field 31 by the second handset 202, such that the base unit 100 can recognize, by analyzing the control data field 31, that an abnormality is detected by the second handset 202 (see the process in step ST07 of FIG. 9).

Further, in a period TxPo(5), the base unit 100 performs multicast transmission of control data including the command instructing the execution of the safety management action (second notification) (see the process in step ST08 of FIG. 9). This control data is received by the second handset 202 in a period RxC2*o*(5) in synchronization with the period TxPo(5), and also received by the first handset 201 in a period RxC1*o*(5) (the period RxC2*o*(5) and the period RxC1*o*(5) defines the same timing). Upon receipt of the command, each of the first handset 201 and the second handset 202 performs the aforementioned safety management action in the period exemplarily indicated in FIG. 11 as "alarm/voice sound output." Further, the base unit 100 also performs the safety management action similarly (see the process in step ST09 of FIG. 9).

Thereafter, in the illustrated example, when the control data transmitted by the base unit 100 in a period TxPo(10) is received by the second handset 202 in a period RxC2*o*(10), it is detected that the distance between the second handset 202 and the base unit 100 is smaller than the "supervision distance," and accordingly, the second handset 202 determines that the radio wave strength has recovered to the normal level. Then, the second handset 202 writes data indicating the recovery of the radio wave strength in the control data field 31 of the response data, and transmits the response data in a period TxC2*o*(2) to the base unit 100. Besides, in a case where the aforementioned monitoring termination operation is performed also, the monitoring is terminated and the period indicated in FIG. 11 as "return to standby mode in response to level recovery or sound output termination operation" is entered.

In the foregoing description, monitoring is performed between the base unit 100 and the second handset 202. However, the second handset 202 and the first handset 201 have the same basic structure and are each equipped with the radio wave strength measurement unit 20. Therefore, it is possible to perform the monitoring by use of the base unit 100 and the first handset 201, in which the person who needs supervision is to carry the first handset 201 instead of the second handset 202. Which of the first handset 201 and the second handset 202 is to be used in the monitoring may be specified by use of the operation unit 7 of the base unit 100, for example.

Second Embodiment

In the following, a second embodiment of the present invention will be described with reference to the appended drawings.

In the first embodiment, monitoring is performed between the base unit 100 and the second handset 202. In the second embodiment, monitoring is performed using the radio waves transmitted and received between the first handset 201 and the second handset 202. Specifically, the second handset 202 is configured to receive control data transmitted from the first handset 201 in the control slot that is set for communication between the first handset 201 and the second handset 202, and the second handset 202 measures the RSSI signal when it receives data for monitoring, to detect an abnormality based on the measured RSSI signal. It is to be noted that the second embodiment assumes the situation shown in FIG. 7B, and the first handset 201 performs the role of the base unit 100 described in the first embodiment.

Figure 12:
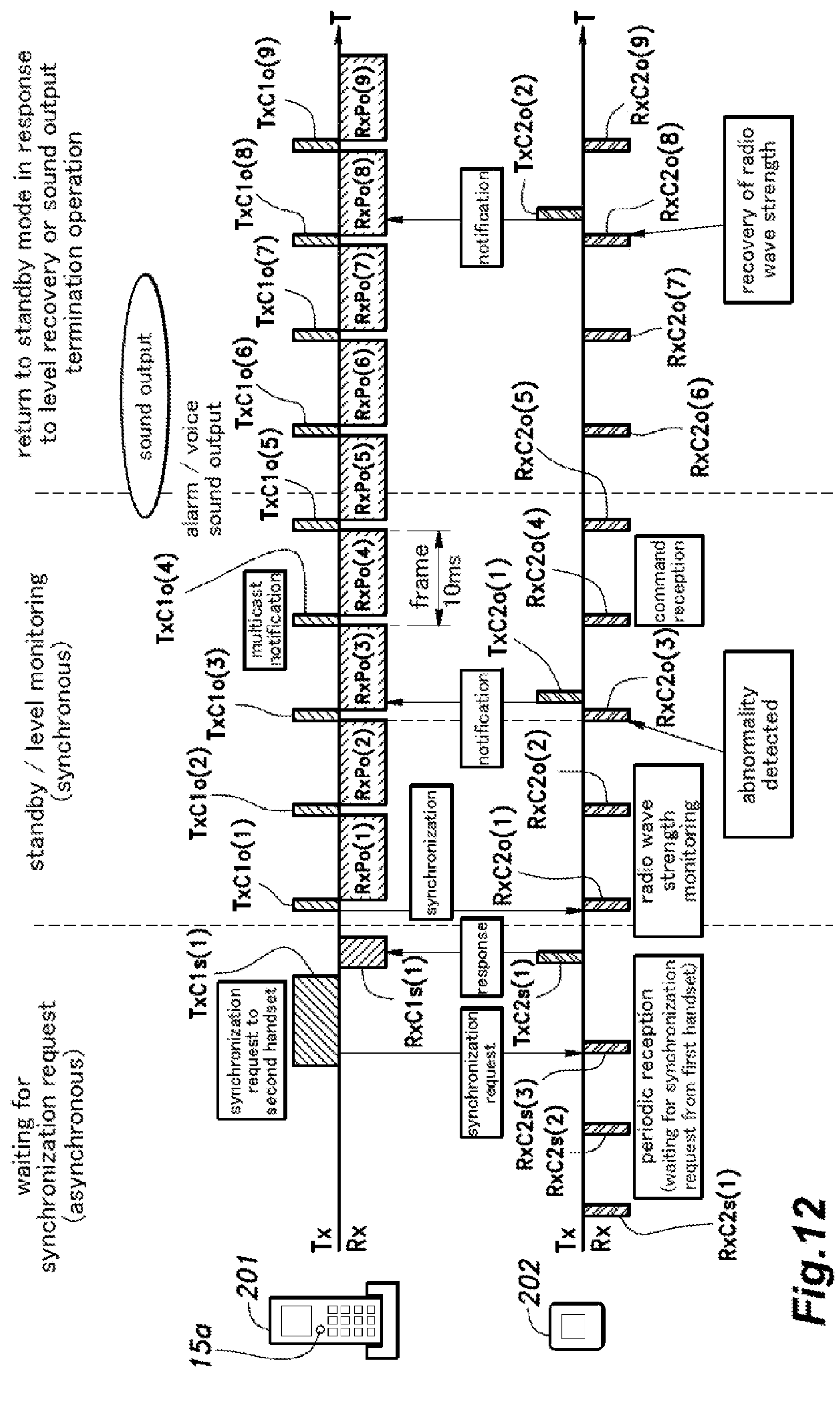
FIG. 12 is an explanatory diagram showing a mode of use of the slots used by the first handset and the second handset of the cordless telephone system according to the second embodiment during execution of a process relating to the safety management action.

FIG. 12 is an explanatory diagram showing a mode of use of the slots used by the first handset 201 and the second handset 202 of the cordless telephone system according to the second embodiment during execution of a process relating to the safety management action. In FIG. 12, it is assumed that the first handset 201 and the second handset 202 are located where they cannot receive the control signal from the base unit 100, namely, outside the communication range of the base unit 100 (though the second embodiment may be applicable to the situation in which the handsets 201 and 202 are located within the communication range of the base unit 100).

In the initial condition, the first handset 201 and the second handset 202 are not synchronized with each other or they are in an asynchronous condition. Further, in the asynchronous period after activation, the second handset 202 performs reception intermittently at relatively long intervals to reduce the power consumption. This intermittent reception is performed in response to the pulse signals generated by the timer unit 60 described above with reference to FIG. 5, and the interval between a period RxC2*s*(1), a period RxC2*s*(2) and a period RxC2*s*(3) in the standby mode shown in FIG. 12 is set at 2 sec, for example.

When the monitoring instruction button 15*a* of the first handset 201 is pressed in this state, the first handset 201 starts sending a synchronization request to the second handset 202. This sending of the synchronization request is performed over a time period longer than at least the interval of the intermittent reception performed by the second handset 202 (in this example, at least 2 sec). Specifically, during a synchronization request period TxC1*s*(1), the first handset 201 transmits control data in every slot of the frame together with information (a correction value) representing a time difference between each slot and the control slot set by the first handset 201. It is to be noted that the control data contains the aforementioned "monitoring mode signal."

In the illustrated example, the control data is received by the second handset 202 in a period RxC2*s*(3), and the second handset 202 sends a response in a period TxC2*s*(1) overlapping a response period RxC1*s*(1) set by the first handset 201. This response is a so-called ACK signal, and after the response, synchronization is established between the first handset 201 and the second handset 202. Further, upon receipt of the "monitoring mode signal," the second handset 202 starts measuring the distance between the first handset 201 and the second handset 202. Thus, a "standby/level monitoring (synchronous)" period is started.

During the "standby/level monitoring (synchronous)" period, transmission and reception between the first handset 201 and the second handset 202 are performed synchronously, in which the first handset 201 transmits the control data in the control slot in each frame (10 ms) set as a period TxC1*o*(*n*), and the second handset 202 receives the control data in a period RxC2*o*(*n*) which is in synchronization with the period TxC1*o*(*n*). The control data sent in each frame includes the aforementioned "monitoring mode signal," and the second handset 202 continuously measures the distance between first handset 201 and the second handset 202.

As described in the foregoing, in the second embodiment, the control slot used to maintain synchronization between the first handset 201 and the second handset 202 is also used to perform monitoring (namely, for measuring the RSSI signal). Specifically, by simply putting the "monitoring mode signal" in the control data (the control data field 31) transmitted from the first handset 201, it is possible to have the second handset 202 measure the RSSI signal and perform the monitoring, without need for the first handset 201 to set a special slot dedicated to performing the monitoring.

If, as a result of the monitoring, an abnormality is detected by the second handset 202, for example, in a period RxC2*o*(3), in which the second handset 202 receives the control data transmitted in a period TxC1*o*(3), the second handset 202 performs the safety management action described above in relation to step ST07 of FIG. 9. It is to be noted that, in the second embodiment, the base unit 100 does not relate to the monitoring, and the notification in step ST07 is made from the second handset 202 to the first handset 201. Namely, the second handset 202 transmits response data to the first handset 201 (first notification) in a period TxC2*o*(1), which is a response slot corresponding to the period RxC2*o*(3) (or TxC1*o*(3)). The response data is received by the first handset 201 in a period RxPo(3). The response data also includes the control data field 31, data indicating the detection of an abnormality is written in the control data field 31 by the second handset 202, such that the first handset 201 can recognize, by analyzing the control data field 31, that an abnormality is detected by the second handset 202. Consequently, the first handset 201 performs the safety management action such as emitting a ringing sound. Further, as described above with regard to the first embodiment, if the response button 55 of the second handset 201 is pressed in this state, a phone call between the first handset 201 and the second handset 202 is established.

Thereafter, in the example shown in FIG. 3, the second handset 202 detects that the distance from the first handset 201 has become smaller than the "supervision distance" or that the measured radio wave strength has recovered to the normal level in a period RxC2*o*(8), in which the control data transmitted by the first handset 201 in a period TxC1*o*(8) is received by the second handset 202. The second handset 202 writes data indicating the recovery of the radio wave strength (or the distance between the first handset 201 and the second handset 202 smaller than the "supervision distance") in the control data field 31 of the response data and transmits the response data to the first handset 201 in a period TxC2*o*(2). As a result, the safety management action performed by the first handset 201 and the second handset 202 is halted, and the handsets enter the normal standby mode.

It is to be noted that in the second embodiment, during the "standby/level monitoring (synchronous)" period, the frame period was 10 ms but the frame period may be set at 20 ms or longer, for example. This can reduce the power consumption, particularly of the second handset 202.

Third Embodiment

In the following, a third embodiment of the present invention will be described with reference to the appended drawings.

In the second embodiment, monitoring is performed using the first handset 201 and the second handset 202. Namely, the first handset 201 transmits the control data to the second handset 202 in the control slot, and when the second handset 202 detects an abnormality when it received the control data, the second handset 202 transmits data indicating the detection of an abnormality to the first handset 201. In the third embodiment, when an abnormality is detected by the second handset 202 that measures the RSSI signal, the detection of an abnormality is first notified from the second handset 202 to the first handset 201, and then, from the first handset 201 to the base unit 100.

Figure 13:
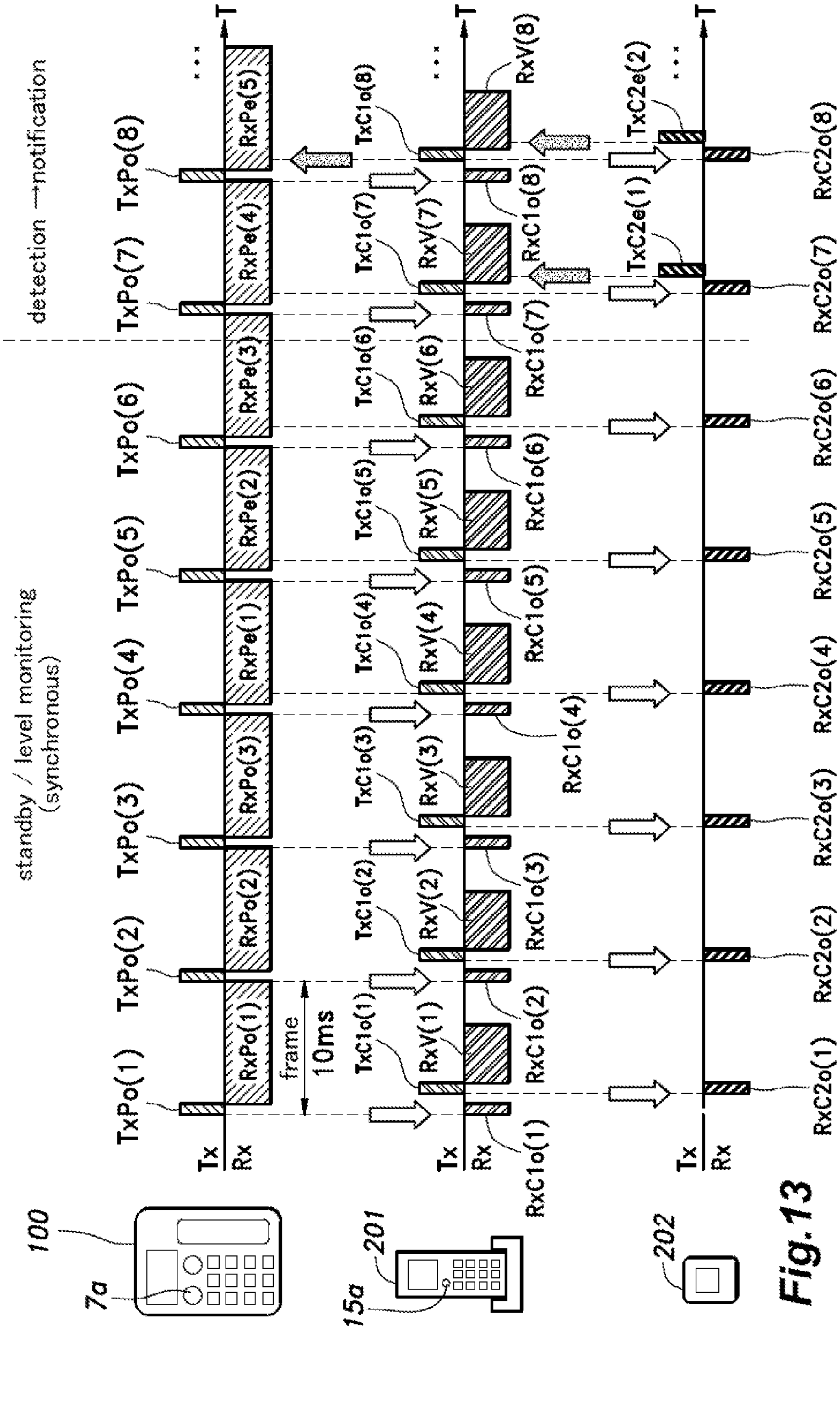
FIG. 13 is an explanatory diagram showing a mode of use of the slots used by the base unit, the first handset and the second handset of the cordless telephone system according to the third embodiment during execution of a process relating to the safety management action.

FIG. 13 is an explanatory diagram showing a mode of use of the slots used by the base unit 100, the first handset 201 and the second handset 202 of the cordless telephone system according to the third embodiment during execution of a process relating to the safety management action. It is to be noted that in FIG. 13, the process of establishing synchronization between the first handset 201 and the second handset 202 described in the second embodiment is not shown, and FIG. 13 shows the state after the "standby/level monitoring (synchronous)" period is entered. It is also to be noted that the third embodiment assumes the situation shown in FIG. 7C.

When the monitoring instruction button 7*a* of the base unit 100 or the monitoring instruction button 15*a* of the first handset 201 is pressed, synchronization is established between the first handset 201 and the second handset 202 according to the process described above in the second embodiment, and the "standby/level monitoring (synchronous)" period is entered. During this period, synchronization is established between the base unit 100 and the first handset 201 such that a period TxPo(n) serving as a first control slot corresponds to a period RxC1*o*(*n*), while synchronization is established between the first handset 201 and the second handset 202 such that a period TxC1*o*(*n*) serving as a second control slot corresponds to a period RxC2*o*(*n*).

It is to be noted here that in a case where the monitoring instruction button 7*a* of the base unit 100 is pressed, first control data transmitted to the first handset 201 in the first control slot contains the "monitoring mode signal" and the first handset 201 which receives the "monitoring mode signal" adds the "monitoring mode signal" to second control data that is transmitted to the second handset 202 in the second control slot. On the other hand, in a case where the monitoring instruction button 15*a* of the first handset 201 is pressed, the second control data containing the "monitoring mode signal" is directly transmitted from the first handset 201 to the second handset 202. Then, the second control data containing the "monitoring mode signal" is repeatedly transmitted from the first handset 201 to the second handset 202 during the "standby/level monitoring (synchronous)" period.

Upon receipt of the second control data containing the "monitoring mode signal," the second handset 202 starts monitoring, and thereafter, when an abnormality is detected, performs a safety management action. Namely, in the example shown in FIG. 13, an abnormality is detected when the second handset 202 receives the second control data transmitted by the first handset 201 in a period TxC1*o*(7) serving as the second control slot, and the second handset 202 transmits response data to the first handset 201 in a period TxC2*e* (1), which is a response slot corresponding to the period TxC1*o*(7), to notify the first handset 201 that an abnormality is detected (first notification). The first handset 201 receives the response data in a period RxV(7), and recognizes, by analyzing the response data, that an abnormality is detected by the second handset 202. Accordingly, the first handset 201 also performs a safety management action such as outputting of a ringing sound. Further, the first handset 201 notifies the base unit 100 in a period TxC1*o*(8) that "an abnormality is detected by the second handset 202" (second notification). At this time, the data transmitted in the period TxC1*o*(8) is received by both the base unit 100 and the second handset 202 (multicast). Thereby, the base unit 100 can indirectly recognize that an abnormality is detected by the second handset 202, and accordingly performs a safety management action such as outputting of a ringing sound. Further, as described above with regard to the first embodiment, if the response button 55 of the second handset 201 is pressed in this state, a phone call between the first handset 201 and the second handset 202 is established.

As described in the foregoing, in the third embodiment, detection of an abnormality by the second handset 202 is notified from the second handset 202 to the first handset 201 in one frame, and from the first handset 201 to the base unit 100 in the next frame in a bucket brigade manner. Namely, the first handset 201 is used as a relay connecting the base unit 100 and the second handset 202, to thereby perform the monitoring in a wider range. As described above with reference to FIG. 8, since the maximum distance at which the communication is possible (i.e., communication range) is larger than the "supervision distance," it is possible to notify the detection of an abnormality to a remote location by use of the first handset 201 and the second handset 202. For example, in a case where a mother with a child goes to park apart from their house by about 100 m, with the child carrying the second handset 202 and the mother carrying the first handset 201, if the child moves away from the mother beyond the "supervision distance," notification is made from the second handset 202 carried by the child to the first handset 201 carried by the mother, and from the first handset 201 to the base unit 100 set in the house, which is more distant from the child (second handset 202). Namely, though the base unit 100 disposed in the house cannot directly receive the result of the monitoring performed by the second handset 202, the first handset 201 connecting the base unit 100 and the second handset 202 allows the base unit 100 to perform "remote monitoring."

In the foregoing, detailed description has been made of the cordless telephone system and the safety management system according to the present invention in terms of the concrete embodiments. However, these embodiments are mere examples and the present invention should not be limited to these embodiments. For example, in the first embodiment, the digital RSSI signal is converted into distance information and the safety management action based on the distance information, but the configuration may be made to omit the conversion into the distance information and to perform the safety management action digital by directly referring to the RSSI signal. It should be noted that not all of the structural elements illustrated in the foregoing embodiments are necessarily indispensable, and they may be selectively used as appropriate within the scope of the present invention.

The cordless telephone system according to the present invention makes it possible to measure the distance between the base unit and the handset and detect wandering behavior or the like reliably and with a simple structure, without need for a special sensor for detecting wandering behavior or the like provided to the handset constituting the cordless telephone system. The system according to the present invention can be embodied based on a cordless telephone system adopting DECT, PHS, sPHS, etc. and favorably used as a safety management system.

The contents of the original Japanese patent application on which the Paris Convention priority claim is made for the present application as well as the contents of the prior art references mentioned in this application are incorporated in this application by reference.

The invention claimed is:

1. A cordless telephone system, comprising:

a base station connected to a telephone line; and a handset configured to transmit and receive radio waves to and from the base station via wireless channel, wherein the handset includes:

a strength measurement circuitry configured to measure a radio wave strength of radio waves received by the handset from the base station; and a controller which performs a prescribed safety management action when the radio wave strength is lower than a predetermined value;

wherein the predetermined value is higher than a minimum wave strength needed for the handset to communicate with the base station, and a communication method between the base station and the handset when the radio wave strength is higher than the predetermined value is the same as when the radio wave strength is lower than the predetermined value.

2. The cordless telephone system according to claim 1, wherein:

the base station and the handset perform transmission and reception based on time division multiple access; and the strength measurement circuitry configured to measure the radio wave strength of radio waves when control data transmitted from the base station is received by the handset.

3. The cordless telephone system according to claim 1, wherein:

the handset further comprises a response button; and the controller is configured, in response to an operation of the response button, to make a phone call to the base station.

4. The cordless telephone system according to claim 1, wherein the safety management action includes at least one of setting off an alarm sound, outputting a predetermined message, making a phone call to a predetermined party, and making notification via the wireless channel.

5. The cordless telephone system according to claim 1, wherein when the controller performs the safety management action and a phone call between the base station and the handset is started, the controller performs the safety management action which does not interfere with the conversation over the phone.

6. The cordless telephone system according to claim 1, wherein:

the base station and the handset perform transmission and reception based on time division multiple access; and the strength measurement circuitry configured to measure the radio wave strength of radio waves when the handset receives control data which includes a signal for measuring the radio wave strength from the base station.

7. A cordless telephone system comprising a base station, a first handset and a second handset, the base station and the first handset being configured to transmit and receive radio waves to and from each other via wireless channel, and the base unit and the second handset being configured to transmit and receive radio waves to and from each other via wireless channel, wherein the second handset includes:

strength measurement circuitry configured to measure a radio wave strength of radio waves received by the second handset from the base station; and a controller which performs a prescribed safety management action when the radio wave strength is lower than a predetermined value, wherein the predetermined value is higher than a minimum wave strength needed for the second handset to communicate with the base station, and a communication method between the base station and the handset when the radio wave strength is higher than the predetermined value is the same as when the radio wave strength is lower than the redetermined value, and wherein the prescribed safety management action includes transmission of a first notification to the base station, and the base station is configured, upon receipt of the first notification, to transmit a second notification to the first handset.

8. The cordless telephone system according to claim 7, wherein:

the base station and the second handset perform transmission and reception based on time division multiple access; and the strength measurement circuitry configured to measure the radio wave strength of radio waves when control data transmitted from the base station is received by the second handset.

9. The cordless telephone system according to claim 7, wherein:

the second handset further includes a response button; and the controller is configured, in response to an operation of the response button, to make a phone call to the base station.

10. The cordless telephone system according to claim 7, wherein the safety management action includes at least one of setting off an alarm sound, outputting a predetermined message, making a phone call to a predetermined party, and making notification via the wireless channel.

11. The cordless telephone system according to claim 7, wherein when the controller performs the safety management action and a phone call between the second handset and one of the base station and the first handset is started, the controller performs the safety management action which does not interfere with the conversation over the phone.

12. The cordless telephone system according to claim 7, wherein:

the base station and the second handset perform transmission and reception based on time division multiple access; and the strength measurement circuitry configured to measure the radio wave strength of radio waves when the second handset receives control data which includes a signal for measuring the radio wave strength from the base station.

13. A cordless telephone system comprising a base station, a first handset and a second handset, the first handset and the second handset being configured to transmit and receive radio waves to and from each other via wireless channel, wherein the second handset includes:

a strength measurement circuitry configured to measure a radio wave strength of radio waves received by the handset from the first handset; and a controller which performs a prescribed safety management action when the radio wave strength is lower than a predetermined value, wherein the predetermined value is higher than a minimum wave strength needed for the second handset to communicate with the first handset, and a communication method between the base station and the handset when the radio wave strength is hi her than the predetermined value is the same as when the radio wave strength is lower than the predetermined value, and wherein the prescribed safety management action includes transmission of a first notification to the first handset.

14. The cordless telephone system according to claim 13, wherein:

the base station and the first handset are configured to transmit and receive radio waves to and from each other; and the first handset transmits a second notification to the base station upon receipt of the first notification from the controller of the second handset.

15. The cordless telephone system according to claim 13, wherein:

the first handset and the second handset perform transmission and reception based on time division multiple access; and the strength measurement circuitry configured to measure the radio wave strength of radio waves when control data transmitted from the first handset is received by the second handset.

16. The cordless telephone system according to claim 13, wherein:

the second handset further includes a response button; and the control unit is configured, in response to an operation of the response button, to make a phone call to the first handset.

17. The cordless telephone system according to claim 13, wherein the safety management action includes at least one of setting off an alarm sound, outputting a predetermined message, making a phone call to a predetermined party, and making notification via the wireless channel.

18. The cordless telephone system according to claim 13, wherein when the controller performs the safety management action and a phone call between the first handset and the second handset is started, the controller performs the safety management action which does not interfere with the conversation over the phone.

19. The cordless telephone system according to claim 13, wherein:

the first handset and the second handset perform transmission and reception based on time division multiple access; and the strength measurement circuitry configured to measure the radio wave strength of radio waves when the handset receives control data which includes a signal for measuring the radio wave strength from the first handset.

20. A safety management system, comprising:

a transmitter configured to emit radio waves; and a receiver configured to be carried by a person who needs supervision and to receive the radio waves emitted by the transmitter, wherein the receiver comprises:

a strength measurement circuitry configured to measure a radio wave strength of radio waves received by the receiver from the transmitter; and a controller which performs a prescribed safety management action when the radio wave strength needed for the handset to communicate with the base station, and;

wherein the predetermined value is higher than minimum wave strength needed for the second handset to communicate with the base station, and a communication method between the base station and the handset when the radio wave strength is higher than the predetermined value is the same as when the radio wave strength is lower than the predetermined value.

21. The cordless telephone system according to claim 20, wherein when the controller performs the safety management action and a phone call between the transmitter and the receiver is started as the safety management action, the controller performs the safety management action which does not interfere with the conversation over the phone.

22. The cordless telephone system according to claim 20, wherein:

the transmitter and the receiver perform transmission and reception based on time division multiple access; and the strength measurement circuitry configured to measure the radio wave strength of radio waves when the handset receives control data which includes a signal for measuring the radio wave strength from the transmitter.

* * * * *